US012696178B2

(12) United States Patent
Desai et al.

(10) Patent No.: US 12,696,178 B2
(45) Date of Patent: Jul. 28, 2026

(54) ACCESS POINT NEIGHBOR DISCOVERY FOR RADIO RESOURCE MANAGEMENT

(71) Applicant: Cisco Technology, Inc., San Jose, CA (US)

(72) Inventors: Vishal S Desai, San Jose, CA (US); Young Il Choi, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 526 days.

(21) Appl. No.: 18/307,785

(22) Filed: Apr. 26, 2023

(65) Prior Publication Data

US 2024/0365214 A1 Oct. 31, 2024

(51) Int. Cl.
*H04W 48/16* (2009.01)
*H04B 17/318* (2015.01)

(52) U.S. Cl.
CPC .......... *H04W 48/16* (2013.01); *H04B 17/318* (2015.01)

(58) Field of Classification Search
CPC ..... H04W 48/16; H04W 24/02; H04W 24/10; H04W 88/08; H04W 72/04; H04W 72/1263; H04W 88/085; H04W 52/02; H04W 48/10; H04W 28/16; H04B 17/318; H04L 41/16; H04L 63/20; H04L 63/10; H04L 69/14
See application file for complete search history.

(56) References Cited

U.S. PATENT DOCUMENTS

| | | | | |
|---|---|---|---|---|
| 9,378,634 | B1 * | 6/2016 | Kashyap | .............. H04B 17/318 |
| 11,206,607 | B2 * | 12/2021 | Chitrakar | .......... H04W 52/0216 |
| 11,689,952 | B1 * | 6/2023 | Azem | ................... H04W 24/10 |
| | | | | 455/423 |
| 2009/0003356 | A1 | 1/2009 | Vaswani et al. | |
| 2010/0214954 | A1 | 8/2010 | Bronez | |
| 2012/0155322 | A1 | 6/2012 | Lamba et al. | |

(Continued)

FOREIGN PATENT DOCUMENTS

| | | | |
|---|---|---|---|
| CN | 114244744 | 3/2022 | |
| WO | WO-2012078236 A1 * | 6/2012 | ........... H04L 65/752 |

OTHER PUBLICATIONS

"Cisco DNA Center AI-Enhanced RRM," Deployment Guide, Cisco 2022, pp. 1-92.

*Primary Examiner* — Un C Cho
(74) *Attorney, Agent, or Firm* — Polsinelli P.C.

(57) ABSTRACT

In one aspect, a method of access point (AP) discovery, by a network controller is disclosed. The method includes receiving, AP configuration information for a plurality of potential neighboring APs. The method includes storing the AP configuration information for the plurality of potential neighboring APs in a neighbor discovery profile. The method includes identifying an inconsistent AP in the neighbor discovery profile, the inconsistent AP identified as undetected by the network controller during one or more of the plurality of times. The method includes determining whether the inconsistent AP should be considered a neighboring AP based on how often the inconsistent AP appears in the neighbor discovery profile. The method includes determining a radio resource management (RRM) operation using information known to the network controller about APs considered to be a neighboring AP to a first AP.

20 Claims, 9 Drawing Sheets

(56) References Cited

U.S. PATENT DOCUMENTS

| | | | |
|---|---|---|---|
| 2015/0289142 A1* | 10/2015 | Abeysekera | H04W 72/0453 370/338 |
| 2017/0094693 A1* | 3/2017 | Law | H04W 8/005 |
| 2017/0245280 A1* | 8/2017 | Yi | H04K 3/00 |
| 2020/0077326 A1 | 3/2020 | Abouelseoud et al. | |
| 2021/0160198 A1* | 5/2021 | Kulkarni | H04L 49/9005 |
| 2021/0377947 A1* | 12/2021 | Changlani | H04L 5/001 |
| 2022/0095416 A1* | 3/2022 | Akhtar | H04W 24/10 |
| 2022/0303108 A1* | 9/2022 | Faxér | H04L 5/1461 |
| 2022/0353771 A1* | 11/2022 | Qiang | H04W 48/08 |
| 2023/0076539 A1* | 3/2023 | Desai | H04W 72/52 |

* cited by examiner

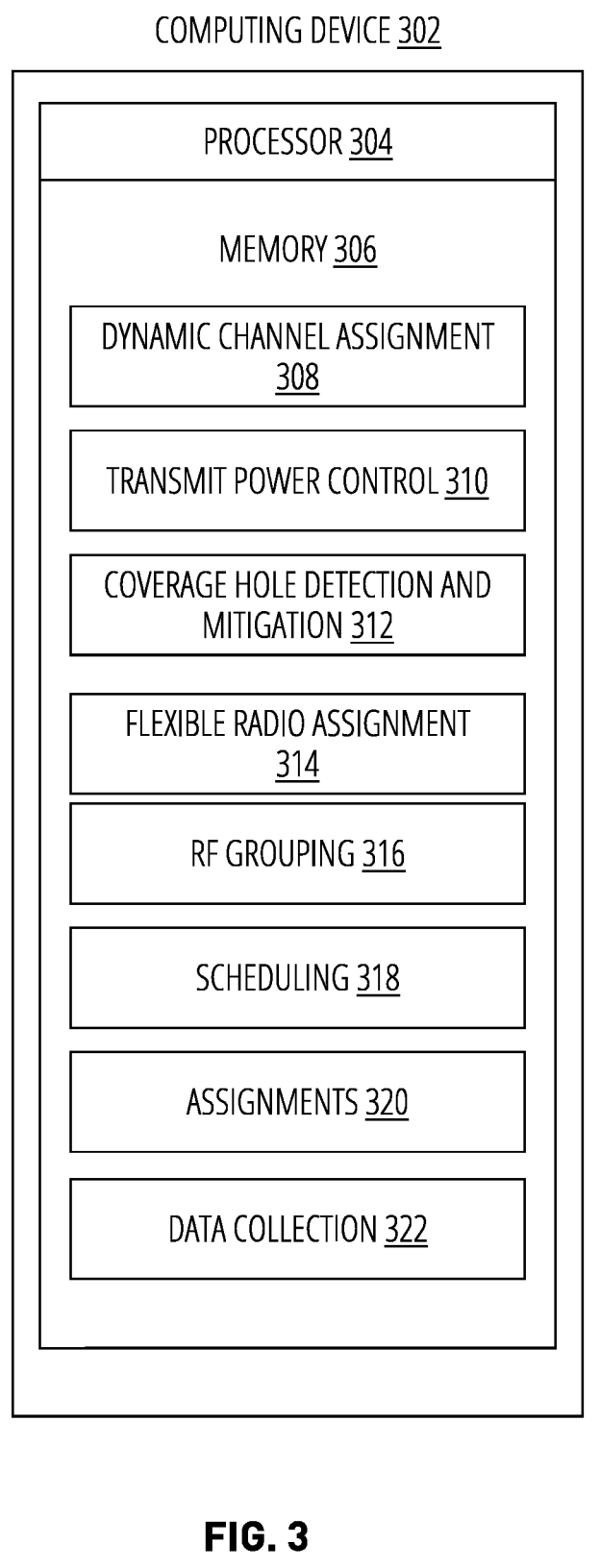

COMPUTING DEVICE 302

PROCESSOR 304

MEMORY 306

DYNAMIC CHANNEL ASSIGNMENT
308

TRANSMIT POWER CONTROL 310

COVERAGE HOLE DETECTION AND
MITIGATION 312

FLEXIBLE RADIO ASSIGNMENT
314

RF GROUPING 316

SCHEDULING 318

ASSIGNMENTS 320

DATA COLLECTION 322

FIG. 3

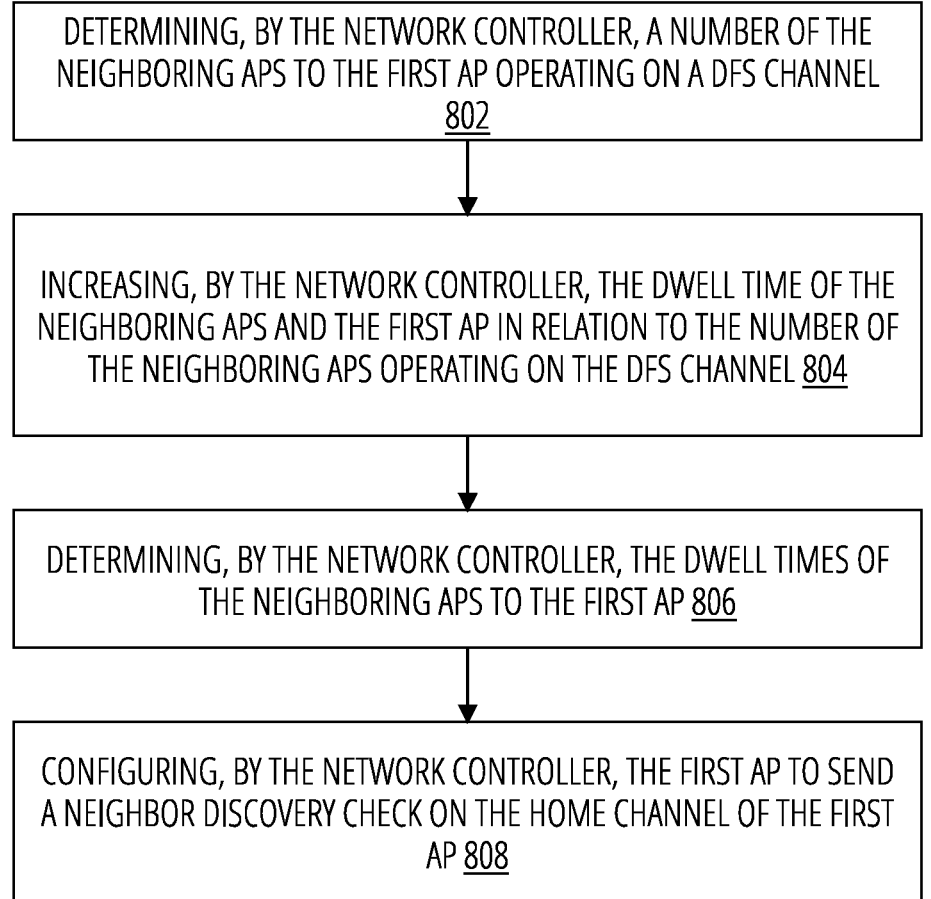

DETERMINING, BY THE NETWORK CONTROLLER, A NUMBER OF THE NEIGHBORING APS TO THE FIRST AP OPERATING ON A DFS CHANNEL 802

INCREASING, BY THE NETWORK CONTROLLER, THE DWELL TIME OF THE NEIGHBORING APS AND THE FIRST AP IN RELATION TO THE NUMBER OF THE NEIGHBORING APS OPERATING ON THE DFS CHANNEL 804

DETERMINING, BY THE NETWORK CONTROLLER, THE DWELL TIMES OF THE NEIGHBORING APS TO THE FIRST AP 806

CONFIGURING, BY THE NETWORK CONTROLLER, THE FIRST AP TO SEND A NEIGHBOR DISCOVERY CHECK ON THE HOME CHANNEL OF THE FIRST AP 808

FIG. 8

ACCESS POINT NEIGHBOR DISCOVERY FOR RADIO RESOURCE MANAGEMENT

FIELD OF THE TECHNOLOGY

The subject matter of this disclosure generally relates to the field of computer networks, and more particularly to the management of radio resources of devices and performing neighbor discovery of the devices in wireless networks of a physical location.

BACKGROUND

Wireless systems employ processes to manage the radio resources of the wireless devices to optimize parameters including channelization, transmit power, etc. The management of the radio helps avoid or mitigate issues with signal interference, bandwidth contention, etc. Newer Wi-Fi standards allow for more bandwidth capacity for Wireless Local Area Network (WLAN). With wide channel bandwidths, e.g., up to 160 MHz, and very high data rates, higher throughput through the WLAN can be attained. However, usage of wide bandwidths contributes to high frequency reuse, which can cause more interference on at least some channels, among Basic Service Sets (BSSs) in a Radio Frequency (RF) neighborhood. Thus, the Access Points (APs) providing wireless access to the WLAN carefully administer Radio Resource Management (RRM) to balance the higher bandwidth capacity and the increased interference potential (caused by overlapping spectrum) when selecting the higher bandwidths.

Access Points (APs) may rely on other communications technologies to connect to the rest of the network or Internet. A common connection is an Ethernet switch, which can be directly attached to the AP. Other technologies, such as 5G networks or Data Over Cable Service Interface Specifications (DOCSIS), may also be used for the management of network resources. The actual capability of the RRM to manage resources based on the actual capacity that the AP can provide to its connected stations may be restricted based on constraints of the APs caused by power failures and system restarts. As a result, service is often interrupted and an RRM is manually triggered in order to resume service.

Using current Radio Resource Management (RRM) techniques, automation schedules RRM computation requests at regular intervals. However, these events or circumstances may be interrupted before the period is completed and the system does not reconfigure, thus leading to poor performance until the next RRM request is fulfilled.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings, and the claims.

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 3 illustrates a computing device that performs various RRM operations according to some aspects of the present technology.

FIG. 8 illustrates an example routine for determining a dwell time of a neighbor AP operating on a DFS channel according to some aspects of the present technology.

DETAILED DESCRIPTION

Figure 1:
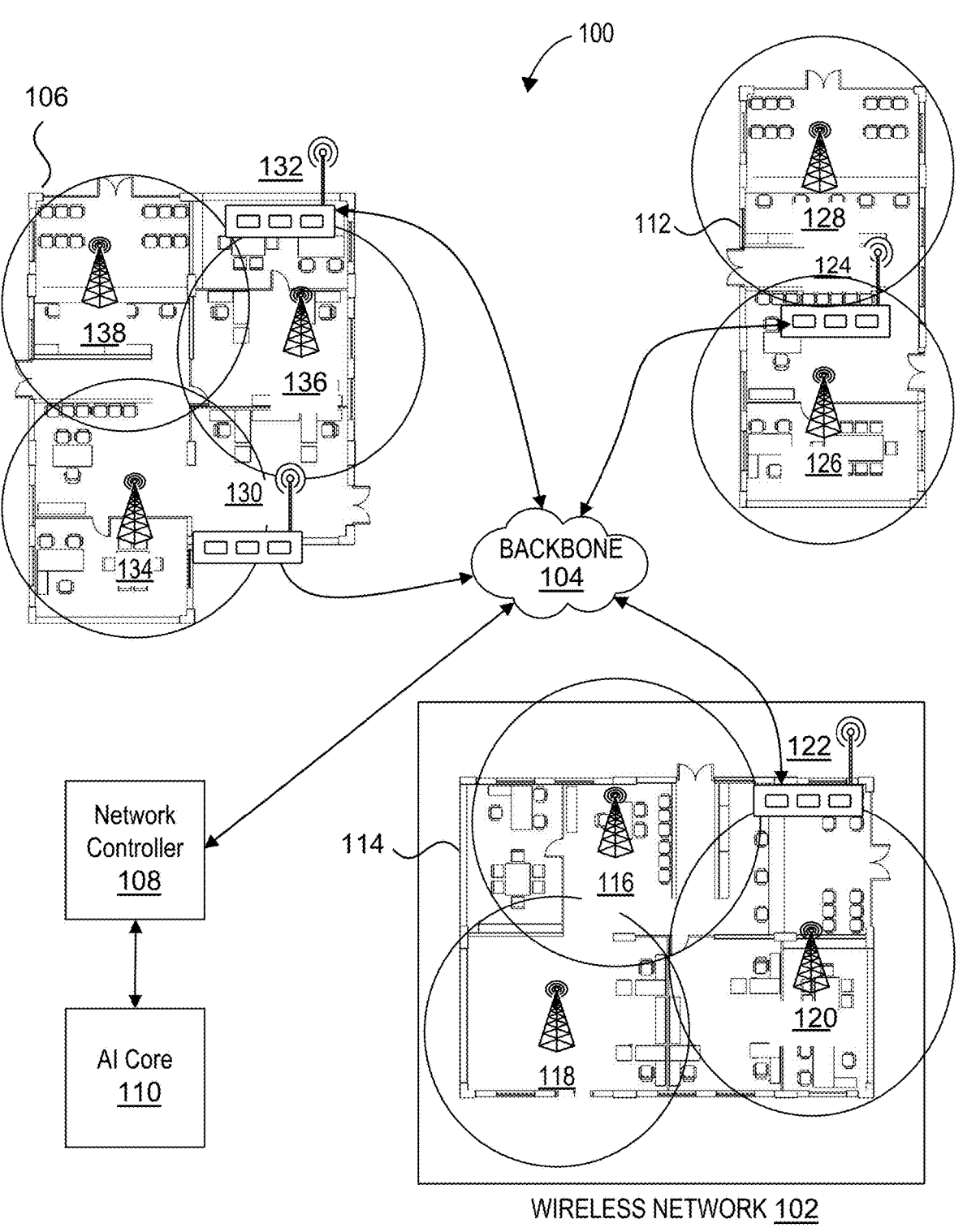
FIG. 1 illustrates an example of a system network, according to some aspects of the present technology.

Various examples of the disclosure are discussed in detail below. While specific implementations are discussed, it should be understood that this is done for illustration purposes. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an example in the present disclosure can be references to the same example or any example; and, such references mean at least one of the examples.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative, and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles can be used in the examples for convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Neighbor discovery is the process of detecting and communicating with nearby APs by a first AP to learn various configuration information that is relevant to understanding the RF environment around the first AP. The first AP can also report this information to a network controller. The process of neighbor discovery assists the network controller with ensuring that access points managed by the network controller are communicating with all of their neighboring APs to learn about the RF environment around the respective APs. Neighbor discovery typically occurs when a device joins the network, and again, periodically thereafter. It involves broadcasting messages out to neighboring access points and receiving their responses. By doing this, networks can keep track of neighboring APs in the vicinity of the first AP so that the first AP or network controller can configure the APs to maximize their coverage and throughput and minimize interference between the neighboring APs. Additionally, by keeping track of neighboring APs, the network controller can make sure that any necessary updates or changes are implemented correctly across all the APs, or a target portion of the APs. This helps maintain a reliable connection and ensures that all devices are able to communicate effectively without interference or other significant events impacting APs in the network.

Existing neighbor discovery processes are unreliable due to a variety of factors. One factor pertains to limitations associated with dynamic frequency selection (DFS) channels. For these channels, standards prohibit devices from transmitting a neighbor discovery check on these channels until they have listened to the channel long enough to know that the channel is clear. Since there is a large number of channels, this means that an AP can't monitor each channel long enough to be certain it has located a neighbor. It also can't transmit a request for neighbor discovery on the channel until it is sure it is clear. Therefore, an AP can fail to detect a neighboring AP. Another factor that can make neighbor discovery unreliable is that periodic interference might mean that an AP sometimes detects a neighbor and sometimes it does not. Another factor that can make neighbor discovery unreliable is that traditional methods do not keep a history of their neighbors and so all neighbors need to be periodically re-detected.

The present disclosure is directed towards smoothing the neighbor discovery process to reduce inconsistencies in neighbor discovery by assuming reciprocity in signal (if a first AP can detect a second AP, we can assume the second AP should be able to detect the first AP), identifying and stitching in missing neighbor information using historical data (if first AP has repeatedly detected a second AP in the past, we can assume that the second AP is still present even if it was not recently detected), and utilizing a non-DFS channel in DFS applications (utilizing more reliable channels to detect neighbors). Accordingly, the technology within the disclosure relates to a method for smoothing the neighbor discovery with the goal of reducing fluctuations. The neighbor discovery can utilize Wireless Local Area Network (WLAN) network information to identify neighboring APs to an access point (AP) by assuming reciprocity in signal, identifying and stitching in missing neighbor information using historical data, and utilizing a non-Dynamic Frequency Selection (DFS) channel in DFS applications.

In some aspects, a method of access point (AP) discovery, by a network controller, is disclosed. The method includes receiving, from a first AP, AP configuration information for a plurality of potential neighboring APs, the AP configuration information being received from the plurality of potential neighboring APs as part of a neighbor discovery protocol performed at a plurality of times. The method includes storing the AP configuration information for the plurality of potential neighboring APs in a neighbor discovery profile for the first AP, where the neighbor discovery profile for the first AP includes historical potential neighbor information including an identification of the potential neighboring APs identified at the plurality of times. The method includes identifying an inconsistent AP in the neighbor discovery profile for the first AP, the inconsistent AP identified as undetected by the network controller during one or more of the plurality of times. The method includes determining whether the inconsistent AP should be considered a neighboring AP to the first AP based on how often the inconsistent AP appears in the neighbor discovery profile for the first AP. The method includes determining a radio resource management (RRM) operation for the first AP using information known to the network controller about APs considered to be a neighboring AP to the first AP.

In an aspect, the method further includes identifying an asymmetric AP for inclusion in the neighbor discovery profile for the first AP as one of the potential neighboring APs, the asymmetric AP is one which is not detected by the first AP, but the first AP was detected by the asymmetric AP which reported the first AP to the network controller.

In an aspect, the method further includes calculating a neighbor discovery index (NDI) which is a metric that represents a spectral power density around the first AP, wherein the NDI is used to determine the RRM operation for the first AP.

In an aspect, the neighbor discovery index (NDI) is a ratio of a sum of RSSI values from the neighboring APs and a number of neighboring APs.

In an aspect, the method further includes determining, by the network controller, the dwell times of the neighboring APs to the first AP, and configuring, by the network controller, the first AP to send a neighbor discovery check on the home channel of the first AP, wherein the transmission time of the neighbor discovery check is approximately half of the time of the dwell time of the neighboring APs.

In an aspect, the method further includes determining, by the network controller, a number of the neighboring APs to the first AP operating on a DFS channel of a plurality of DFS channels; and increasing, by the network controller, the dwell time of the neighboring APs and the first AP in relation to the number of the neighboring APs operating on the DFS channels, such that the dwell time is longer when there are more of the neighboring APs operating on the DFS channels.

In an aspect, the determining whether the inconsistent AP should be considered a neighboring AP to the first AP further includes giving a higher weight to instances in which the inconsistent AP was detected when the inconsistent AP was detected on a non-DFS channel when the first AP is operating on a DFS channel.

In an aspect, the determining whether the inconsistent AP should be considered a neighboring AP to the first AP further includes giving a higher weight to instances in which the inconsistent AP was detected when the inconsistent AP was detected on a non-DFS channel when the first AP is also operating on a non-DFS channel.

In an aspect, the method further includes identifying the plurality of potential neighboring AP from a received signal strength indicator (RSSI) of at least one of the neighbor APs.

In an aspect, the set of neighboring APs is identified in the historical network information based on a transmit power control exceeding a threshold.

In one aspect, network device includes one or more memories having computer-readable instructions stored therein, and one or more processors configured to execute the computer-readable instructions to receive, from a first AP, AP configuration information for a plurality of potential neighboring APs, the AP configuration information being received from the plurality of potential neighboring APs as part of a neighbor discovery protocol performed at a plurality of times. The processor is configured to execute the instructions and cause the processor to store the AP configuration information for the plurality of potential neighboring APs in a neighbor discovery profile for the first AP, where the neighbor discovery profile for the first AP includes historical potential neighbor information including an identification of the potential neighboring APs identified at a plurality of times. The processor is configured to execute the instructions and cause the processor to identify an inconsistent AP in the neighbor discovery profile for the first AP, the inconsistent AP identified as undetected by the network controller during one or more of the plurality of times. The processor is configured to execute the instructions and cause the processor to determine whether the inconsistent AP should be considered a neighboring AP to the first AP based on how often the inconsistent AP appears in the neighbor discovery profile for the first AP. The processor is configured to execute the instructions and cause the processor to determine a radio resource management (RRM) operation for the first AP using information known to the network controller about APs considered to be a neighboring AP to the first AP.

In one aspect, one or more non-transitory computer-readable media include computer-readable instructions, which when executed by one or more processors of a network appliance, cause the network appliance to receive, from a first AP, AP configuration information for a plurality of potential neighboring APs, the AP configuration information being received from the plurality of potential neighboring APs as part of a neighbor discovery protocol performed at a plurality of times. The one or more processors of a network appliance, cause the network appliance to store the AP configuration information for the plurality of potential neighboring APs in a neighbor discovery profile for the first AP, where the neighbor discovery profile for the first AP includes historical potential neighbor information including an identification of the potential neighboring APs identified at the plurality of times. The one or more processors of a network appliance, cause the network appliance to identify an inconsistent AP in the neighbor discovery profile for the first AP, the inconsistent AP identified as undetected by the network controller during one or more of the plurality of times. The one or more processors of a network appliance, cause the network appliance to determine whether the inconsistent AP should be considered a neighboring AP to the first AP based on how often the inconsistent AP appears in the neighbor discovery profile for the first AP. The one or more processors of a network appliance, cause the network appliance to determine a radio resource management (RRM) operation for the first AP using information known to the network controller about APs considered to be a neighboring AP to the first AP.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

Some wireless communications systems (for example, Wi-Fi or WLAN systems) may support allocating multiple resource units (RUs) over a channel bandwidth. For example, an access point (AP) may allocate each of multiple RUs to one or more respective stations (STAs). For example, the AP may transmit a downlink (DL) OFDMA communication that includes multiple RUs each addressed to a respective STA. Similarly, the AP may transmit scheduling information to multiple STAs that indicates an RU allocation. The RU allocation may indicate which RU each of the STAs is to use to transmit an uplink (UL) OFDMA communication to the AP. Each of the RUs includes a fixed number of tones or subcarriers. Some of the tones (a majority of the tones in some cases) are used to carry data symbols, and some of the tones ("pilot tones") are used to carry pilot symbols. Pilot signals may be transmitted with the data to improve reception and reliability of the data.

Example Embodiments

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Neighbor discovery is a crucial building block for radio resource management (RRM) algorithms to accurately and efficiently carry out their functions. It provides an essential input to many processes of RRM yet the data gathered through neighbor discovery can often be unreliable—especially when dealing with Dynamic Frequency Selection (DFS) channels. Sometimes access points become operationally down or network issues arise with DFS that impact the accuracy of neighbor discovery. As such, it is not uncommon for WLAN operators to experience problems related to neighbor discovery. This can have a significant detrimental effect on RRM algorithms and cause delays in convergence times as well as cascade into other areas of the network's performance. The present technology improves these limitations in neighbor discovery.

Access points (APs) detect neighboring AP through a process called scanning. Scanning allows APs to discover other APs operating nearby, which is essential for optimizing wireless network performance and avoiding interference. There are two primary scanning methods used by APs to detect neighbors.

In a first scanning method, APs can detect neighboring APs through passive scanning. In passive scanning, the AP listens for beacon frames transmitted by neighboring AP. Beacon frames are periodically sent by APs, usually every 100 ms, to announce their presence and provide essential information, such as the Service Set Identifier (SSID), supported data rates, and channel information. By monitoring the received beacon frames, the AP can discover neighboring AP and gather information about their operating parameters.

In a second scanning method, APs can detect neighboring APs through active scanning. In active scanning, the AP sends out Probe Request frames on each channel within its frequency range. These Probe Request frames are a way for the AP to actively search for neighboring AP. Upon receiving a Probe Request frame, a neighboring AP will respond with a Probe Response frame containing information about its configuration, such as SSID, supported data rates, and channel information. The scanning AP can then analyze the received Probe Response frames to discover and learn about neighboring AP.

Both passive and active scanning have their advantages and disadvantages. Passive scanning is less intrusive, as it only requires the AP to listen for beacon frames, but it may take longer to discover neighbors due to the periodic nature of beacon transmissions. Active scanning is more aggressive and can discover neighbors faster, but it generates additional network traffic and can consume more power.

In addition to these scanning methods, some APs and wireless controllers may use proprietary or vendor-specific protocols to discover neighbors and share information about the wireless environment. For optimal performance, APs should continuously scan for neighboring AP to adapt to changing network conditions. Information gathered from neighbor discovery can be used for various purposes, such as channel selection, load balancing, and interference management. This helps maintain a reliable and efficient wireless network.

DFS channels present challenges to existing neighbor discovery algorithms. Dynamic Frequency Selection (DFS) channels are implemented in wireless communication systems to ensure that access points (APs) do not interfere with radar systems operating on the same frequency. As a result, APs must perform radar detection and avoid channels occupied by radar systems. This presents several challenges related to access point neighbor discovery on DFS channels. However, it is increasingly difficult to transmit on a DFS channel until you have performed a connection admission control (CAC) validation, or until you have heard an enabling beacon transmitted by another AP on your network. The enabling beacon indicates that your network already knows that the DFS channel is clear, and you can transmit on it. However, upon the first use of the enabling beacon on the channel, the enabling beacon is sent out every 100 ms. One such challenge pertains to channel availability. Due to the shared use of the radio spectrum with radar systems, not all DFS channels are available at any given time. Access points must constantly monitor and adapt to the dynamic nature of DFS channels, making it more difficult to discover neighboring APs. Another challenge is initial channel selection requiring Channel Availability Checks (CAC), which can take from 1 minute up to 10 minutes depending on the regulatory domain and thus increase setup times for AP discovery.

The CAC can also impact neighbor discovery due to limited visibility. APs can only discover neighbors operating on the same channel. As a result, the dynamic nature of DFS channels can make it difficult for APs to maintain a consistent view of the neighboring network landscape.

Overall, the CAC can significantly impact neighbor discovery and AP visibility, leading to suboptimal channel allocation decisions, inefficient network adjustments, and degraded network performance. To mitigate these issues, it is important to take into account the effects of DFS on neighbor discovery when designing wireless networks. Implementing appropriate strategies such as using a dedicated monitoring channel for neighbor discovery or using multiple channels with different regulatory domains can help optimize neighbor discovery in environments where DFS is required. Additionally, deploying advanced Wi-Fi solutions that are capable of detecting off-channel neighbors despite CAC restrictions may also help improve overall network performance. The previously discussed challenges highlight the need for robust and adaptive algorithms in AP neighbor discovery on DFS channels. Solutions like enhanced scanning techniques, adaptive channel allocation, and machine learning-based approaches can help improve the efficiency and reliability of AP neighbor discovery in DFS environments.

Access points (APs) detect neighboring AP through a process called scanning. Scanning allows APs to discover other APs operating nearby, which is essential for optimizing wireless network performance and avoiding interference. There are two primary scanning methods used by APs to detect neighbors.

In a first scanning method, APs can detect neighboring APs through passive scanning. In passive scanning, the AP listens for beacon frames transmitted by neighboring AP. Beacon frames are periodically sent by APs, usually every 100 frames.

The technology in this disclosure provides examples of using the channel the AP is currently transmitting on to find neighboring APs. Using the currently transmitting channel allows APs to use active scanning capabilities in order to find the neighboring APs. DFS channels often have requirements and regulations relating to how long a DFS channel can transmit an enabling beacon. As such, when the AP is using a channel that is an non-DFS channel, due to the lack of restrictions, the AP can have an increased dwell time, allowing the AP to transmit the neighbor discovery request on the non-DFS channel. Thus, the neighbor discovery request is likely to be heard by anyone scanning the channel. When a neighboring AP hears the request, the neighboring AP can respond with its neighbor information.

In another example, historical network data can be used by the network controller in order to identify missing neighboring APs that inconsistently respond to neighbor discovery checks. An inconsistently detected neighboring access point in neighbor discovery is an access point that is detected but fails to respond when the network attempts to establish a connection. This can occur due to issues such as incorrect settings, interference, or other environmental factors. When this happens, it can prevent the network from being able to properly discover and connect with all of its neighbors, leading to poor performance. As such, the network controller can periodically monitor for neighbor discovery at various time periods and filter out data for neighbors infrequently discovered, and assume neighbors exist for neighboring APs that aren't consistently discovered. Thus, the network controller can assume that the AP is still a neighbor and use the historical data from the inconsistent AP to make their RRM calculations.

Network Controller

In some examples, sometimes, a transmitting (Tx) neighbor can't hear a neighbor that can hear it. Since this is reported to the network controller by the receiving (Rx) neighbor, the network controller can assume that a Tx neighbor is still an RF neighbor to the Rx neighbor, even though the Tx neighbor didn't hear a reciprocal transmission from its neighbor. The controller can derive the RSSI signal strength based on differences in transmit power between the two APs even though RSSI signal strength wasn't detected.

The disclosure further implements a method of using power spectral density. As such, the disclosure can use a calculated power spectral density instead of using a count of the neighboring APs in Flexible Radio Assignment (FRA). Flexible Radio Assignment (FRA) is a feature in modern wireless network systems, particularly in Cisco Technologies Inc.'s wireless solutions. FRA dynamically adjusts the roles of the access point (AP) radios to optimize network performance based on the needs of the wireless environment. AP radios can operate as either a 2.4 GHz or 5 GHz radio or a dedicated monitoring radio (also called a Wireless Security and Spectrum Intelligence (WSSI) module).

Load balancing using power spectral density helps evenly distribute client load among APs.

For interference management, power spectral density could show co-channel or adjacent-channel interferences when AP density is high. FRA modifies AP radio channels and transmits power levels to reduce these interferences and enhance network performance.

Radio role assignment makes use of the power spectral density to determine each AP's best role; for example, an AP with power spectral density might benefit from being set as dual-band for improved coverage. If power spectral density is high, FRA may assign some radios as WSSI modules to monitor and take action on any security threats.

Lastly, power spectral density is used in channel planning too; FRA can assign channels more efficiently by judging the number of neighboring APs and minimize interference for better network performance.

Figure 2:
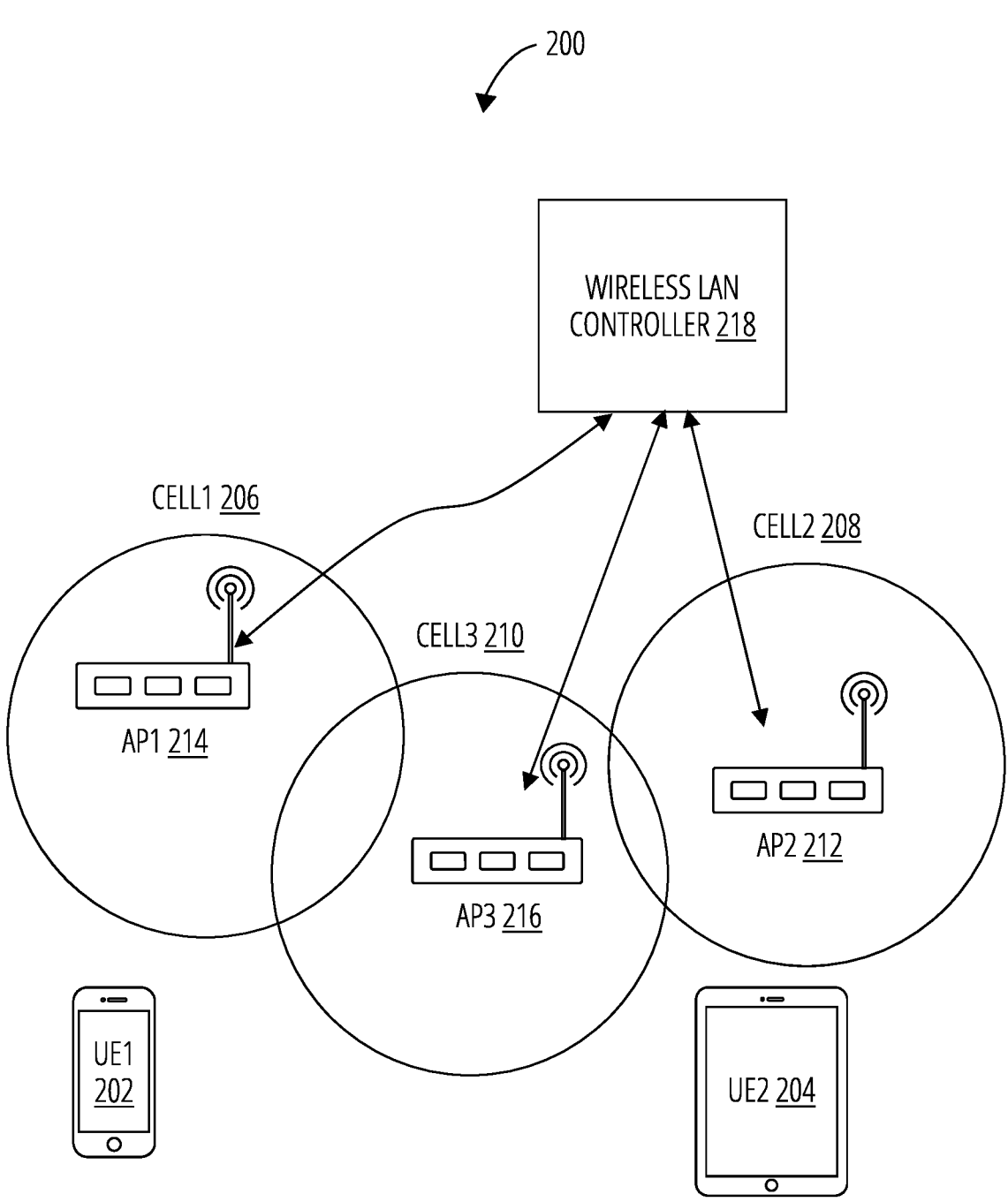
FIG. 2 illustrates an example wireless network according to some aspects of the present technology.

Prior to describing the proposed techniques and methods, example network environments and architectures for the triggering of RRM compute requests, as illustrated in FIG. 1, FIG. 2 and FIG. 3 are described first.

FIG. 1 illustrates an example of a system network 100 that includes three buildings (i.e., building A 106, building B 112, and building C 114). In this non-limiting example, building A 106 includes two wireless local area network (LAN) controllers (WLCs) and three access points (APs). Here, a first RF Group is formed among the wireless LAN controller WLC A1 130 and access points AP A1 134 and AP A3 138. A second RF Group is formed by WLC A2 132 and access points AP A2 136. Building B 112 includes a single RF group: wireless LAN controller WLC B 124 and access points AP B1 126 and AP B2 128. Finally, building C 114 includes wireless network 102, which has a single RF group, which is made up of one wireless LAN controller (i.e., WLC 122) and three access points (AP1 118, AP2 116, and AP3 120). In some embodiments, the WLCs are access points, where the grouping of access points has elected one of the access points to be the WLC. The WLCs can be, e.g., a CISCO WLC such as WLC model numbers 9800, 8500, 7500, 5520, 5760, 5508, 3850, and 2500. The WLCs can transmit and receive signals to and from the backbone 104. For example, communications between the backbone 104 and the WLCs can be performed via control and provisioning of wireless access points (CAPWAP) protocol.

The settings of the WLCs can be controlled by a network controller 108, which communicates with the WLCs via the backbone 104. For example, the network controller 108 can be a CISCO Digital Network Architecture (DNA) center, which is a centralized intent-based network management system. The network controller 108 can be based in the cloud, for example. Further, an artificial intelligence (AI) core 110 communicates signals to and from the network controller 108. The A.I. Core 110 can, e.g., signal configuration recommendations, and then some or all of the configuration recommendations can be implemented by the network controller 108, which signals network settings and configurations to the WLCs. The WLCs then apply the configurations and settings to the APs.

For example, the network controller 108 can receive signals from each WLC. Each of the signals received can be monitored and monitor the signals received for telemetry and wireless frequency restrictions that may be caused by the configurations of the APs. The signals received can be affected by the structure of each of the three buildings (i.e., building A 106, building B 112, and building C 114). Although each building may have various AP configurations or structural elements that make up the WLCs of each of building A 106. building B 112, and building C 114. Each portion of building A 106, building B 112, and building C 114 may have a plurality of APs positioned through a floorplan of each of the buildings, each of which may have one or more communications with neighbor APs that may affect the overall performance of the network. The effect of data traffic transmitted between each of the APs can be monitored based on the telemetry data collected on the wireless network 102.

For example, the A.I. Core 110 can receive information such as telemetry data collected on the wireless network 102, and the A.I. Core 110 processes the received information to generate configuration recommendations for the wireless network 102. The configuration recommendations can be provided based on structural changes in the buildings, or an overload of data traffic in any portion of the APs for each of the WLCs. The received information may include information related to transmission, reception, interference, exceptions, mitigation events, and so forth. In some aspects, the APs may also collect telemetry information from each other and may communicate using a neighbor discovery protocol (NDP). The A.I. Core 110 may be, for example, a cloud-based application that learns from the wireless network 102 and from additional wireless networks how best to optimize the network configurations based on data and measured values from the respective networks. The configuration recommendations are then sent from the A.I. Core 110 to the network controller 108. The recommendations received can trigger the initiation of RRM operations to improve the overall network performance of one or more of the WLCs monitored by the network controller.

In some examples, each of building A 106, building B 112, and building C 114 represent multiple portions of the same building, as multiple floors, or as a part of the same geographical region. The network controller 108 can monitor, via the backbone 104, each of the buildings to determine how to most efficiently provide network resources to handle data traffic as it affects each building during various time periods or upon experiencing qualifying events.

FIG. 2 illustrates an example wireless network 200 according to some aspects of the present disclosure. The wireless network 200 includes a wireless LAN controller 218, and several access points (APs) (e.g., AP1 214, AP2 212, and AP3 216). Each AP has a surrounding cell in which user devices, such as UE 1 (UE1) 202 and UE 2 (UE2) 204 can wirelessly communicate with the respective AP of the cell (e.g., cell1 206 surrounds AP1 214; cell2 208 surrounds AP2 212; cell3 210 surrounds AP3 216). As the user device moves from one cell to the next, the user device will change which cell it is communicating with. The wireless network 200 provides wireless communications with one or more devices, such as user devices and various other user equipment.

A network administrator can interact with the network controller 108 using a graphical user interface (GUI) that enables the network administrator to specify various settings, including, e.g., settings for when to apply configuration recommendations and which of the configuration recommendations to apply at which times and to which parts of the wireless network 200. Then the configuration recommendations can be implemented by the network controller 108 in accordance with the specifications of the network administrator (or other uses and users).

The wireless LAN controller 218 can communicate with a wide area network (WAN) to allow the user devices to access the internet, for example. The wireless LAN controller 218 can give the network administrator the ability to monitor and trace all the data traffic between the APs, and the information associated with the performance of the network, including key performance indicators (KPIs). Based on the KPIs and the monitored data traffic, the wireless LAN controller 218 can dynamically adjust the configurations of the APs to meet network demands based on increased data traffic during various time periods and the management of devices that are allowed to connect to the network. The wireless network 200 can be a WiFi network operating in accordance with an IEEE 802.11 protocol.

The AI Core 414 can be used to perform radio resource management (RRM). RRM allows the wireless network 200 to continuously analyze the existing RF environment and automatically adjust each APs' power and channel configurations to help mitigate interference (e.g., adjacent channel interference, co-channel interference, electromagnetic interference, etc.) and signal coverage problems. RRM can reduce the need to perform exhaustive site surveys, and RRM can increase system capacity, and provides automated self-healing functionality to compensate for RF dead zones and AP failures. The RRM, in furtherance of performing RRM operations, can also perform radio resource monitoring, power control transmission, dynamic channel assignment, coverage hole detection and correction, and RF grouping.

In some examples, the RRM can be remotely communicative with the AI Core 414 or embedded into one or more network appliances of the wireless network 200 and provide real-time RF management of the wireless network 200. Real-time RF management can be based on the monitoring of interference, noise levels, the received signal strength (RSSI), and signal-to-noise ratio (SNR) for all connected clients and the traffic load of the network, including the total bandwidth used for transmitting and receiving traffic for AP1 214, and AP2 212, as it relates to each of the UE1 202 and UE2 204.

RRM includes several algorithms, which together provide management of the wireless network 200 and resources of the wireless network 200. FIG. 3 illustrates a computing device 302 that performs various RRM steps/methods capable of performing algorithms for radio resource management of a network. Computing device 302 can be performed using distributed computing. Some or all of the functions of computing device 302 can be performed by the WLCs and some or all of the functions may be performed by the network controller 108 and/or the AI Core 414. In some examples, the computing device 302 can be an embodiment of the AI Core 414, illustrated in FIG. 2. In some embodiments, the functions attributed to computing device 302 may reside across the AI Core 414, the network controller 108, and other devices illustrated in wireless network 200. The computing device 302 includes a processor 304 that performs the steps of the respective methods when executing the respective methods stored in memory 306. The methods stored in the memory 306 can include, for example: (i) RF Grouping 316 (e.g., an algorithm responsible for determining the RF Group Leader and members); (ii) Flexible Radio Assignment (FRA) 314 (e.g., an algorithm charged with identifying redundant radios resources and re-assigning the resource to a better role); (iii) Dynamic Channel Assignment (DCA) 308 (e.g., a global algorithm that runs on the RF Group leader); (iv) Transmit Power Control (TPC) 310 (e.g., a global algorithm that runs on the RF Group Leader; and (v) Coverage Hole Detection and Mitigation (CHDM) 312 (e.g., a local algorithm that runs on each individual controller). The respective methods help to maintain optimal performance by optimally applying resources to balance various countervailing interests.

For example, increasing the transmit power in a cell (e.g., cell1 206 of an AP1 214) may help to overcome noise from the environment, but too much of an increase in the transmit power could cause interference with neighboring cells (e.g., cell3 210 of AP3 216), especially in regions where two or more cells overlap. If two cells overlap one another and the cells are on the same channel, then they share the spectrum, resulting in diminished communication capacity. Not only are users of each cell sharing the single channel of the available spectrum, the management traffic also increases, which also takes up a part of the channel capacity. The result is higher consumption of air time and less throughput. This is commonly known as co-channel interference. Assuming all wireless devices are operating on the same network, two aspects of the wireless network 200 can be controlled to mitigate co-channel interference. For example, to adjust any given cell in response to co-channel interference, the wireless network 200 can adjust the channel plan to facilitate the maximum separation of one AP from another AP on the same channel, and the wireless network 200 can adjust power levels to increase or decrease the size of the effective cells corresponding to respective APs. If more than two channels are available, neighboring cells can operate on different channels, avoiding interference in overlapping regions between cells.

The use of RRM has several advantages, including features that manage specific traffic types or client types, which can greatly increase spectral efficiency and assist RRM in providing a better user experience. RRM can further provide advantages including improved quality of service, increased resilience and reliability, better utilization of resources, reduced maintenance costs, enhanced spectrum efficiency, and faster response times to changes in the environment. RRM can be used to reconfigure networks dynamically so that they are able to adjust quickly when something unexpected occurs without needing manual intervention. This ensures that the network is running optimally and maximizes efficiency. Additionally, RRM allows for more precise control over the wireless environment, leading to better user experience and improved overall performance.

The RRM can be organized according to a hierarchy with an RF Group Name at the top level, then RF Group leader(s) at the next level, which is then followed by RF Neighborhood(s) at the lower level, For any RF Group Name, multiple RF group Leaders may exist (e.g., one or more RF group Leaders frequencies in the 2.4 GHz band and one or more RF group Leaders frequencies in the 5 GHz band). An RF Group Leader can manage multiple RF Neighborhoods.

The hierarchical structure of RRM begins with the RF Group Name and is followed by location, floor, department, building, and network. Each level in the hierarchy adds another layer of detail that helps define the network configuration's scope. This allows for more granular control over monitoring and managing the RF topology. At each level, specific parameters can be adjusted to customize the network configuration in order to get the best performance under different conditions. This hierarchical structure allows for maximum customization of RRM to effectively meet the needs of a given network environment.

The RF grouping 316 methods are used as the basis for the administrative and physical management domains within the RF Network. Regarding the administrative domain, the proper function of the RRM is based on knowing which APs and controllers are under administrative control for each part of the network. For example, the RF Group name can be an identifier that all controllers and APs within the group will share. Regarding the physical RF domain, the RRM calculates channel plans and power settings based on an awareness of the RF Location of the APs within the network. For example, neighbor messaging can use the RF Group Name in a special broadcast message that allows the APs in the RF group to identify one another and to measure their RF Proximity. This information can then be used to form RF Neighborhoods within the RF Group (e.g., a group of APs that belong to the same RF Group that can physically hear one another's neighbor messages above −80 dBm, for example). Each RF Group has at least one RF Group Leader per frequency band (e.g., 2.4 GHz, 5 GHz, 6 GHz). The RF Group Leader can be the physical device responsible for: (i)

configuration; (ii) running the active algorithms; and (iii) collecting and storing RF-group data and metrics.

In certain non-limiting examples, the Neighbor Discovery Protocol (NDP) is performed by sending an NDP packet from every AP/Radio/Channel on an interval (e.g., every 60 seconds or less). The NDP packet is a broadcast message that APs listen for and allows the AP to understand how every radio on every channel hears every other radio. The NDP packet also provides the actual RF path loss between APs. When an AP receives an NDP message, the AP validates whether the message is from a member of its RF Group. If the NDP message is valid, the AP forwards the message along with the received channel and RSSI to the controller. The forwarded message is added to the neighbor database, which is periodically forwarded to the RF group leader. For each AP, each radio can store up to a predefined number of neighbors ordered by RSSI high to low. Post-processing of the RSSI information can generate measurements for RX Neighbors (e.g., how the given AP hears other APs) and TX Neighbors (e.g., how other APs hear the given AP).

The FRA 314 uses the NDP messages to locate each radio based on RF distance and evaluate overlapping coverage by cell. Now, the flexible radio assignment 314 methods is described according to certain non-limiting examples. First, using the NDP measurements from the APs, FRA plots the x and y coordinates relative to every other AP contained in the solution set (AP Group, physical neighbors). The circumference of each cell is calculated based on the present TX power level of each AP. This produces a logical matrix of the AP's coverage intersections. Based on this understanding, FRA uses a multipoint analysis to determine the percentage of overlapping coverage for each evaluated AP. The output of this calculation is the COF (Coverage Overlap Factor %). The Coverage Overlap Factor is the percentage of the analyzed cell covered at −67 dBm or higher by other radios in service. In calculating this coverage, the FRA method 314 keeps track of radios that are coverage contributors to other radios COF, and the FRA method 314 prevents those radios to be marked redundant as long as a radio they are a contributor for is marked redundant.

Once a Radio is marked redundant, the next step depends on the radio configuration. For example, there can be two (or more) operational states to which the flexible radio can be assigned: (i) FRA-auto or (ii) manual. When the radios are in the "FRA Auto" state, flexible radios can be assigned in order to allow for dynamic reconfiguring of the network, thus, FRA looks to DCA to decide what to do with the now redundant radio(s). DCA's priorities are, first, to try to assign the redundant radio in 5 GHz and increase capacity, but if the DCA determines that there is already maximum 5 GHz coverage, the radio will be assigned to a monitor role instead. This allows the network controller using RRM algorithms to adjust parameters dynamically as needed in order to allow for more efficient utilization of resources, increased performance, and improved user experience. In this state, the radio is not simply sitting idle but rather is constantly monitoring and adjusting parameters as needed so that it can maintain optimal performance at all times.

Regarding the dynamic channel assignments 308 method, the DCA monitors the available channels for the RF group and tracks the changing conditions. The DCA then optimizes the RF separation between APs (minimizing co-channel interference) by selecting channels that are physically diverse, which maximizes RF efficiency. According to certain non-limiting examples, the DCA can monitor all available channels and develops the Cost Metric (CM) that will be used to evaluate various channel plan options. The CM can be an RSSI value comprised of interference, noise, a constant (user sensitivity threshold), and load (if enabled). The Cost Metric equates to a weighted SNIR (Signal to Noise Interference Ratio). The Group Leader can maintain the neighbor lists for all APs in the RF Group and organizes these neighbors into RF Neighborhoods. The DCA can use the following metrics, which can be tracked for each AP in the RF Group: (i) same channel contention (e.g., other APs/clients on the same channel—also known as Co-Channel interference or CCI); (ii) foreign channel—rogue (e.g., other non-RF Group APs operating on or overlapping with the AP's served channel); (iii) noise (e.g., sources of interference such as Bluetooth, analog video, or cordless phones); (iv) channel load (e.g., through the use of industry-standard QBSS measurements—these metrics are gathered from the Phy layer—very similar to CAC load measurements); and (v) DCA sensitivity (e.g., a sensitivity threshold selectable by the user that applies hysteresis to the evaluation on channel changes). The impact of each of these factors can be combined to form a single RSSI-based the metric known as the Cost Metric (CM). The CM then represents complex and interference ratio (SNIR) of a specific channel, which is used to evaluate the throughput potential of one channel over another. The goal is to select the best channel for a given AP/Radio that minimizes interference.

The transmit power control 310 method balances the competing objectives of increasing SNR for the current AP while avoiding co-channel interference with neighboring AP. Since one of the major sources of interference in the network is the signals from other/neighboring AP, the transmit power control 210 method is important for optimal performance. That is, DCA and TPC work hand in hand to manage the RF environment. Transmit power largely determines our cell boundaries. The goal is to maximize the RF coverage in the environment without causing co-channel interference.

According to certain non-limiting examples, TPC uses the TX neighbor and RF Neighbor lists generated by the NDP method. RSSI organized lists built on how reception strength (Rx) from other APs (RX Neighbor) and transmit strength (Tx) to other APs (TX Neighbor), to form a picture of the communication strength among the respective APs within the RF Neighborhood and RF Group. Based on this information TPC sets the transmit power of each AP to maximize the coverage and minimize co-channel interference. TPC will adjust the Tx power up or down to meet the coverage level indicated by the TPC Threshold. TPC runs on the RF Group leader and is a global algorithm that can be sub-configured in RF profiles for groups of APs in an AP group.

According to examples of the disclosure, the CHDM 312 can be used to achieve the following objectives: (i) detect coverage holes, (ii) validate the coverage holes, and (iii) mitigate the coverage holes. That is, CHDM 312 first detects and mitigates coverage holes (if possible without creating other problems) by increasing the transmit power and, therefore, cell area. According to certain non-limiting examples, CHDM can be a local algorithm that runs independent of RRM and the RF Group leader. To facilitate making decisions at a local level, CHDM can run on every controller. That is, each individual controller performs coverage hole detection monitoring all associated APs and thus monitoring every attached client and their received signal levels. Mitigation involves increasing the power of an AP, or group of APs to improve coverage levels to a certain area where client signals fall below a customer selectable threshold.

According to certain non-limiting examples, coverage hole detection can be based on a 5-second (CHD measurement period) histogram of each client's RSSI values maintained by the AP. Values between −90 and −60 dBm are collected in a histogram in 1 dB increments. A client falling below the configured RSSI thresholds for 5 seconds can be marked, e.g., as a pre-coverage hole event.

According to certain non-limiting examples, coverage hole mitigation is a process performed once the decision to mitigate is made. If a coverage hole exists and it meets certain criteria for mitigation (e.g., a minimum number of clients and a minimum percentage), the AP will increase power by one step. CHDM will then continue to run, and if additional mitigation is called for will re-qualify, and power will again be increased by 1 step. This incremental approach can prevent wild and unstable swings in power.

Coverage hole mitigation, while operating independently of DCA and TPC, can significantly affect surrounding APs and the balance of the RF in an environment. Part of the decision to mitigate is based on evaluating whether the mitigation could be successful. Increasing the power of a given AP independently of the RF Group metrics is likely to negatively impact surrounding APs. So mitigation can be applied judiciously. The combination of the new detection metrics and the power limits included in mitigation are applied to make CHDM a stable algorithm.

In addition to the above methods, the memory 306 of the computing device 302 can also store information for scheduling 318, assignments 320, and information for data collection 322. The data collection 322 can include several types of measurements.

With respect to data collection 322, the RRM processes collected data, which is then used in the organization of RRM as well as for processing channel and power selections for the connected APs. Now, a discussion is provided for how and where to configure monitoring tasks and how the collected data relates to an operational environment.

The collected data processed by the RRM can include several RRM metrics that assist with monitoring the network's overall performance or a portion of the APs in the network. Some common RRM metrics include signal strength, signal-to-noise ratio (SNR), throughput, latency, jitter, packet loss rate, and utilization. These metrics all indicate different aspects of performance within the wireless environment and are important in order to get an accurate picture of how the network is operating. Signal strength and SNR are used to measure the quality of the connection, throughput, and latency are used to measure how quickly data is able to travel over the network, jitter measures how consistent the connection is, packet loss rate indicates how many packets of data are being dropped along the way, and utilization measures the amount of capacity that is being used on a given channel. These metrics help indicate how well RRM is performing and can be used to determine if any changes need to be made.

Channel scanning, such as passive channel scanning, can be performed on all channels supported by the selected radio. Additionally or alternatively, channel scanning can be performed on a set of channels (i.e., the channel set) defined by the DCA method, which can include all of the non-overlapping channels. The channel set can be modified in accordance with user inputs, for example. Additionally, a passive dwell lasting a predefined duration (e.g., 50 msec.) can detect rogue devices and collect noise and interference metrics. Also, a Neighbor Discovery Protocol Transmission (TX) can send the NDP message from all channels defined to be part of a monitor set.

Figure 4A:
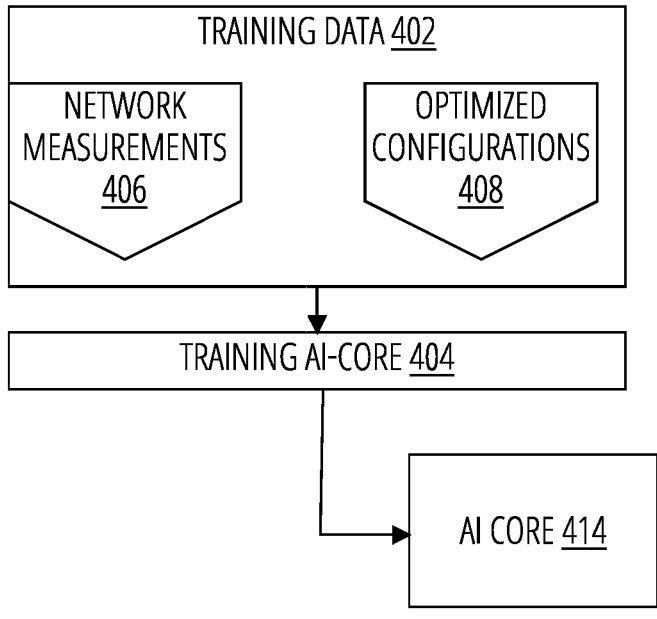
FIG. 4A illustrates an example of training the artificial intelligence (A.I.) Core according to some aspects of the present technology.

FIG. 4A illustrates an example of training the AI Core 414. In block 404, training data 402 is applied to training the AI Core 414. For example, the AI Core 414 can be an artificial neural network (ANN) that is trained via supervised learning using a backpropagation technique to train the weighting parameters between nodes within respective layers of the ANN. Training data 402 is obtained in training AI-core 404, supervised learning is obtained, and the network is iteratively updated to reduce an error/loss function. The value of the error/loss function decreases as the AI Core 414 outputs configurations that increasingly approximate the optimized configurations 408. In other words, ANN infers the mapping implied by the training data, and the error/loss function produces an error value related to the mismatch between the optimized configurations 408 and the output from the AI Core 414 that is produced by applying the network measurements 406 to the AI Core 414. For example, in certain implementations, the cost function can use the mean-squared error to minimize the average squared error. In the case of a multilayer perceptron (MLP) neural network, the backpropagation algorithm can be used for training the network by minimizing the mean-squared-error-based cost function using a gradient descent method.

Training a neural network model essentially means selecting one model from the set of allowed models (or, in a Bayesian framework, determining a distribution over the set of allowed models) that minimizes the cost criterion (i.e., the error value calculated using the error/loss function). Generally, the ANN can be trained using any of the numerous algorithms for training neural network models (e.g., by applying optimization theory and statistical estimation).

For example, the optimization method used in training artificial neural networks can use some form of gradient descent, using backpropagation to compute the actual gradients. The optimization is performed by taking the derivative of the cost function with respect to the network parameters and then changing those parameters in a gradient-related direction. Non-limiting examples of backpropagation training algorithms include: a steepest descent method (e.g., with variable learning rate, with variable learning rate and momentum, and resilient backpropagation), a quasi-Newton method (e.g., Broyden-Fletcher-Goldfarb-Shannon, one step secant, and Levenberg-Marquardt), or a conjugate gradient method (e.g., Fletcher-Reeves update, Polak-Ribićre update, Powell-Beale restart, and scaled conjugate gradient). Additionally, evolutionary methods, such as gene expression programming, simulated annealing, expectation-maximization, non-parametric methods and particle swarm optimization, can also be used for training the AI Core 414.

The training in block 404 404 of the AI Core 414 can also include various techniques to prevent overfitting to the training data 402 and for validating the trained AI Core 414. For example, boot strapping and random sampling of the training data 402 can be used during training.

In addition to supervised learning used to initially train the AI Core 414, the AI Core 414 can be continuously trained by using reinforcement learning based on the network measurements and the corresponding configurations used on the network. The AI Core 414 can be cloud-based and can be trained using network measurements and the corresponding configurations from other networks that provide feedback to the cloud.

Further, other machine learning (ML) algorithms can be used for the AI Core 414, and the AI Core 414 is not limited to being an ANN. For example, there are many machine-learning models, and the AI Core 414 can be based on machine learning systems that include generative adversarial networks (GANs) that are trained, for example, using pairs of network measurements and their corresponding optimized configurations.

As understood by those of skill in the art, machine-learning based classification techniques can vary depending on the desired implementation. For example, machine-learning classification schemes can utilize one or more of the following, alone or in combination: hidden Markov models, recurrent neural networks (RNNs), convolutional neural networks (CNNs); Deep Learning networks, Bayesian symbolic methods, generative adversarial networks (GANs), support vector machines, image registration methods, and/or applicable rule-based systems. Where regression algorithms are used, they can include but are not limited to: a Stochastic Gradient Descent Regressors, and/or Passive Aggressive Regressors, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Figure 4B:
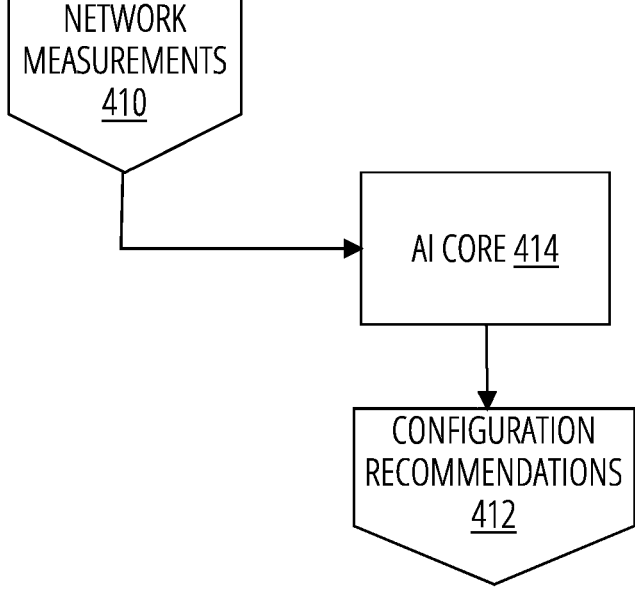
FIG. 4B illustrates an example of using the trained A.I. Core according to some aspects of the present technology.

FIG. 4B illustrates an example of using the trained AI Core 414. AI Core 414 can be trained to provide RRM configuration in order to optimize the performance of a wireless network. This is done by providing the AI Core 414 with data related to variables such as signal strength and latency. With this data, the AI Core 414 is able to identify patterns that would otherwise not be visible initially, and assist with providing configuration recommendations to the network controller, to provide for a more efficient, stable network environment.

The actual network measurements are applied to the trained AI Core 414, which then generated configuration recommendations 412. The configuration recommendations will then be provided to a network controller 108, which selectively applies the configuration recommendations in accordance with the settings therein. For example, the configuration recommendations can be applied a predefined times for certain portions of the wireless network 200. For example, certain configuration recommendations may be applied when there is a radio reset. Other configuration recommendations be applied when there is minimal risk of disrupting service during business hours. Further, different regions within the wireless network 200 might be scheduled differently.

Figure 5:
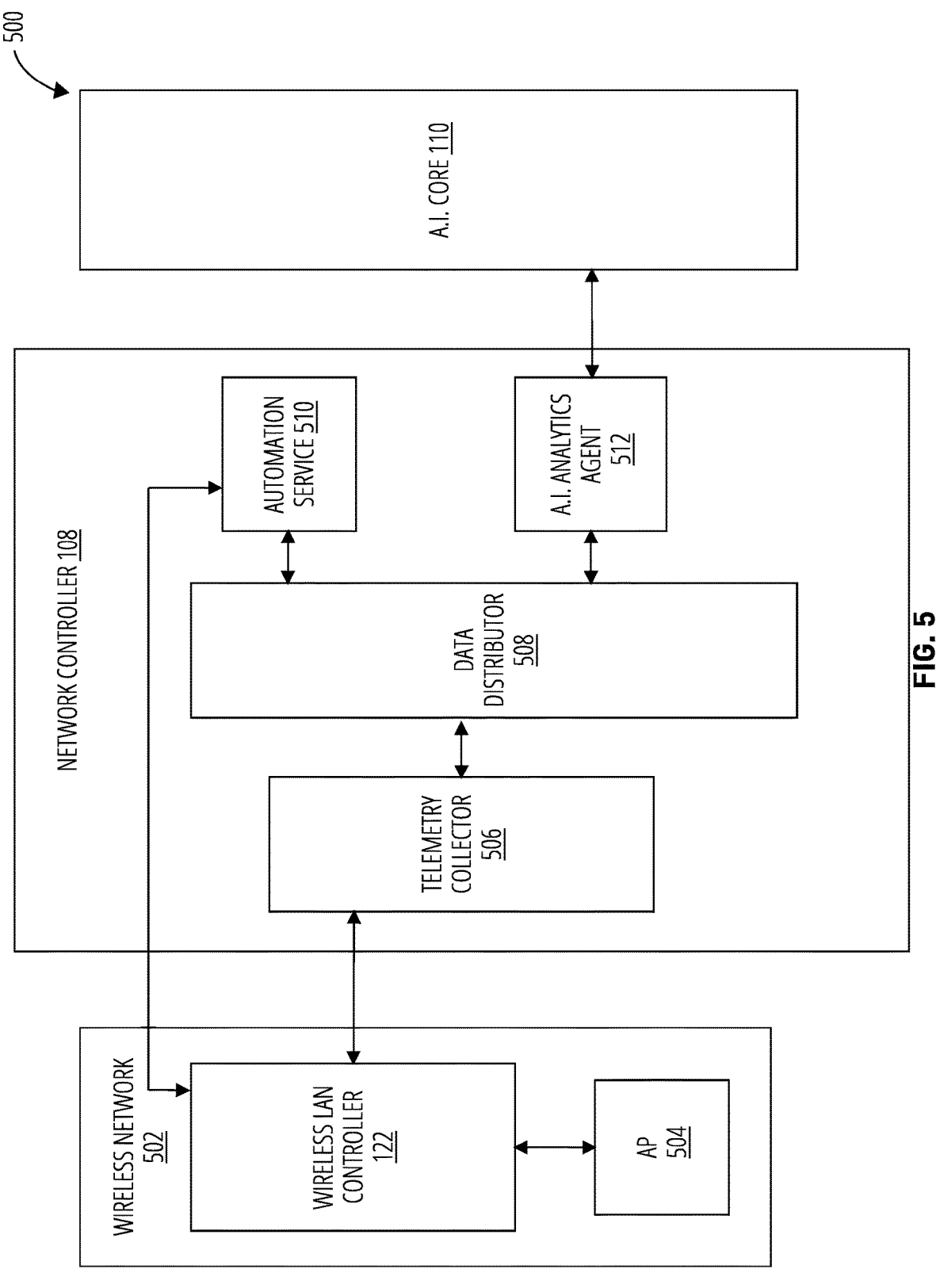
FIG. 5 illustrates an example process of transmitting configuration recommendations to APs based on radio frequency (RF) telemetry according to some aspects of the present technology.

FIG. 5 illustrates an example system 500 for transmitting configuration recommendations to APs based on RF telemetry according to some aspects of the present disclosure.

FIG. 5 shows a wireless network 502, including at least one wireless LAN controller (while wireless LAN controller 122 is illustrated throughout FIG. 5, the WLAN controller can be any of WLAN controllers in the network including wireless LAN controller 122, WLC B 124, WLC A1 130, WLC A2 132, etc.) in communication with at least one Network controller 108 that analyzes data via the A.I. analytics agent 512 and A.I. Core 110. The Network controller 108 includes components such as a telemetry collector 506, Data distributor 508, automation service 510, and A.I. analytics agent 512, all of which are communicatively connected to the A.I. Core 110. This architecture allows network controllers to monitor access points 504 via telemetry reported to the network controller 108 and wireless frequency restrictions with the help of AI core technology. While the APs 504 and the wireless LAN controller 122 have limited ability to locally adjust some operating parameters based on local RF conditions, better overall network performance is achieved when configuration decisions are made by the network controller 108 which has information about the larger RF environment. However, even the network controller 108 is limited in that its RRM capabilities are limited by training on data for the particular network to which the network controller 108 manages. Further, the network controller 108 might be limited in the amount of historical information it can store and analyze to provide the system 500 with the benefits of longer-term insights. Therefore, giving the network controllers the ability to receive RRM configurations from both the network controller 108 and the A.I. Core 110 can improve overall performance.

The wireless LAN controller 122 is connected to network controller 108 through a CAPWAP protocol that allows the network controller 108 to manage all wireless termination points associated with the network controller 108. The network controller 108 monitors this data using RF telemetry sent from the wireless LAN controllers 122 via a tapped delay line (TDL) channel to the telemetry collector 506 located at network controller 108. This data is then sent to the automation service 510 of the network controller 108. The automation service 510 performs continuous monitoring and updating of network parameters, including the report of new channel power updates and network automation.

According to some examples, AP 504 as shown in FIG. 5 is an example of any of AP1 118, AP2 116, AP3 120, AP B1 126, AP B2 128, AP A1 134, AP A2 136, and AP A3 138 in FIG. 1. For example, the network controller 108 in FIG. 1 can manage AP A1 134, AP A2 136, and AP A3 138 of WLC A1 130 through the monitoring of RF telemetry received through the backbone 104. The network controller 108 can transmit the RF telemetry of each of the APs 134, 136, 138 to the A.I. Core 110 to be analyzed for RRM configuration adjustments. The A.I. Core 110 can analyze the RF telemetry and provide continuous updating of the network parameters as received from the network controller 108, including the report of new channel power updates and network automation targeted at improving the telemetry and frequency restrictions of one or more of the APs 134, 136, 138.

The Telemetry collector 506 receives network data from the wireless LAN controller 122 and prepares it for publication to the data distributor 508. This published network is sent to the automation service 510. The automation service 510 is configured to identify any conflicts related to APs 504 and store them to create real-time triggers in response to the conditions experienced on the wireless network 502. When the automation service 510 receives the device configurations, an RF topology of the physical location of the wireless network is generated for transmission to the data distributor 508.

According to some examples, a network controller 108 can receive the RF telemetry from the wireless LAN controllers 122, prior to being received by the A.I. Core 110. The data center can collect the RF telemetry of AP A1 134, AP A2 136, and AP A3 138 of WLC A1 130, and prepare the RF telemetry to be published to the A.I. Core 110 for analysis. When the A.I. Core 110 receives the device configurations, an RF topology of the physical location of the WLC A1 130 can be generated for transmission to the network controller 108 for management of the APs 134, 136, 138, of WLC A1 130.

The A.I. analytics agent 512 can receive data from the Data distributor 508, automation service 510, and A.I. Core 110. In some embodiments, the A.I. analytics agent 512 is an interface to the A.I. Core 110. The A.I. analytics agent 512 can pre-process data, anonymize data, and pass RRM requests between the network controller 108 and the A.I. Core 110. In some embodiments, the A.I. analytics agent 512 can report the data through a user interface plugin.

The automation service 510 is configured to transmit RRM compute requests related to the RF topology and device configurations sent by the data distributor 508 to the A.I. analytics agent 512. Upon receiving the RRM compute requests and RRM telemetry from the data distributor 508, the A.I. analytics agent 512 sends them to the A.I. Core 110 via a gateway.

The A.I. Core 110 then processes this data to identify configuration recommendations and transmits them back to the network controller 108 for further transmission to the data distributor 508. The data distributor 508 then publishes the RRM decision that includes RRM management operations to the automation service 510 for transmission to the network controller 108.

According to some examples, the A.I. Core 110 can process RF telemetry, received from the APs 134, 136, 138, of WLC A1 130, that is published and transmitted by the data center. The A.I. Core 110 can analyze the RF telemetry, and identify configuration recommendations that could remedy the restrictions experienced by the APs. The A.I. Core 110 can transmit the configuration recommendations to the network controller 108 which can transmit the configuration recommendations to the wireless LAN controller 122 for implementation amongst APs 134, 136, 138. In some embodiments, the configuration recommendations from A.I. Core 110 can be presented to an administrator to be accepted before being sent to the wireless LAN controller 122 for implementation.

These RRM management operations are not initially scheduled by the network controller 108 and thus, any updated device configurations for the wireless LAN controller 122 initiated by the network controller 108, are transmitted from the automation service 510. The real-time triggers generated by the automation service 510 are due to conditions reported by the Network controller 108. In this manner, the A.I. Core 110 is able to provide the network controller 108 configuration recommendations in response to unscheduled RRM operation requests, which are triggered and executed at the Network controller 108.

Figure 6:
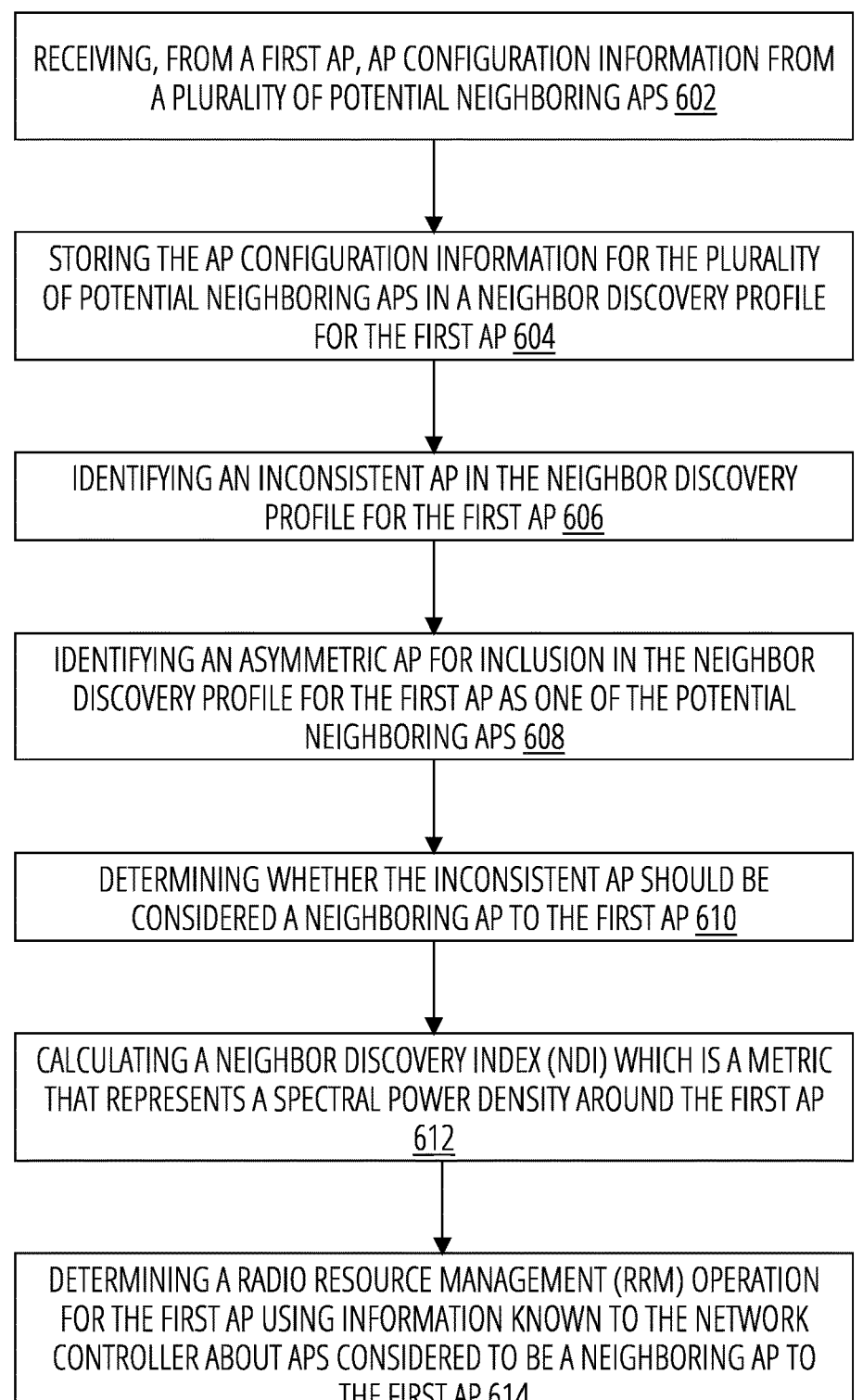
FIG. 6 illustrates an example routine of access point (AP) discovery by a network controller according to some aspects of the present technology.

FIG. 6 illustrates an example routine for access point (AP) discovery by a network controller according to some aspects of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence. Further, while the operations addressed with respect to FIG. 6 are referred to as being performed by the network controller 108, these operations can be performed by the A.I. Core 110.

According to some examples, the method includes receiving, from a first AP, AP configuration information for network information for a plurality of potential neighboring APs at block 602. For example, the network controller 108 illustrated in FIG. 5 may receive, from a first AP 504, AP configuration information for network information from a plurality of potential neighboring APs. The AP configuration information can be received from the plurality of potential neighboring APs as part of a neighbor discovery protocol performed at a plurality of times. The plurality of potential neighboring APs can transmit a received signal strength indicator (RSSI) in response to receiving the AP configuration information.

According to some examples, the method includes storing the AP configuration information for the plurality of potential neighboring APs in a neighbor discovery profile for the first AP at block 604. For example, the network controller 108 illustrated in FIG. 5 may store the AP configuration information for the plurality of potential neighboring APs in a neighbor discovery profile for the first AP 504. The neighbor discovery profile for the first AP 504 includes historical potential neighbor information including an identification of the potential neighboring APs identified at a plurality of times. The set of neighboring APs can be filtered if the transmit power control does not exceed a threshold.

According to some examples, the method includes identifying an inconsistent AP in the neighbor discovery profile for the first AP at block 606. For example, the network controller 108 illustrated in FIG. 5 may identify an inconsistent AP in the neighbor discovery profile for the first AP. The inconsistent AP is an AP that is inconsistently detected through historical network data that is monitored and tracked by the network controller. For example, the inconsistent AP may respond to a neighbor discovery request at a first time in a time period, but may not respond in one or more other times. Due to inconsistency in responses to the neighbor discovery requests at different times, the network controller 108 can rely on the historical network data to detect the inconsistent AP and the inconsistent APs potential neighboring APs.

According to some examples, the method includes identifying an asymmetric AP for inclusion in the neighbor discovery profile for the first AP as one of the potential neighboring APs at block 608. For example, the network controller 108 illustrated in FIG. 5 may identify an asymmetric AP for inclusion in the neighbor discovery profile for the first AP 504 as one of the potential neighboring APs. The asymmetric AP is one which is not detected by the first AP 504, but the first AP 504 was detected by the asymmetric AP which reported the first AP 504 to the network controller 108.

Figure 7:
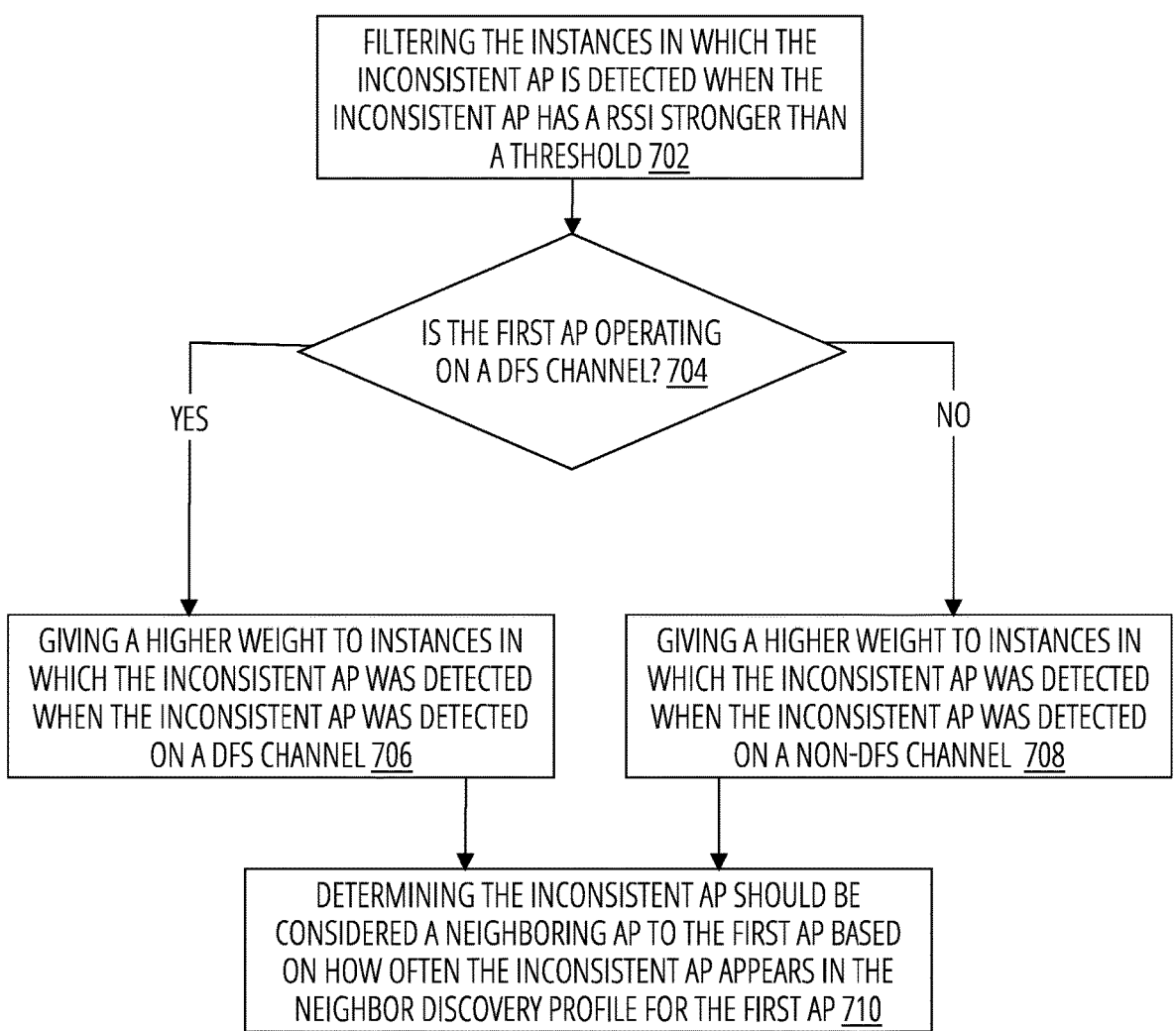
FIG. 7 illustrates an example routine for filtering inconsistent AP instances operating on a dynamic frequency selection (DFS) channel according to some aspects of the present technology.

According to some examples, the method includes determining whether the inconsistent AP should be considered a neighboring AP to the first AP at block 610. For example, the network controller 108 can reference the historical network data to determine if the inconsistent AP is a neighboring AP to the first AP. Due to the inconsistency in the response to the neighbor discovery requests, the network controller 108 is may not be able to validate the existence of the inconsistent AP, and thus can rely on the historical network data to detect the inconsistent AP and the inconsistent APs potential neighboring APs. If during a first time period, the inconsistent AP is able to be heard by the first AP, the network controller 108 can conclude that he inconsistent AP is a neighboring AP of the first AP 504. FIG. 7 includes further detail on whether an inconsistent AP is considered a neighboring AP.

According to some examples, the method includes calculating a neighbor discovery index (NDI) which is a metric that represents a spectral power density around the first AP at block 612. For example, the network controller 108 illustrated in FIG. 5 may calculate a neighbor discovery index (NDI) which is a metric that represents a spectral power density around the first AP 504. The neighbor discovery index (NDI) is a metric used by networks to identify the quality of a connection between two access points. The NDI takes into account factors such as signal strength, interference levels, and number of wireless channels that are being used. By measuring these parameters, the network can determine if the first AP or neighboring APs need to be reconfigured in order improve the connection quality between each AP. In some examples, a higher NDI can indicate that the network is able to more easily detect neighboring APs and newly added neighboring APs, allowing for the ability to efficiently receive device related information related to the AP, as well as additional network data related to neighboring APs.

According to some examples, the method includes determining a radio resource management (RRM) operation for the first AP using information known to the network controller about APs considered to be a neighboring AP to the first AP at block 614. For example, the network controller 108 illustrated in FIG. 5 may determine an RRM operation for the first AP 504 using historical network data known by the network controller 108 about potential neighboring APs to the first AP 504.

FIG. 7 illustrates an example routine for filtering inconsistent AP instances operating on a dynamic frequency selection (DFS) channel according to some aspects of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence. Further, while the operations addressed with respect to FIG. 6 are referred to as being performed by the network controller 108, these operations can be performed by the A.I. Core 110.

According to some examples, the method includes filtering the instances in which the inconsistent AP is detected when the inconsistent AP has a RSSI stronger than a threshold at block 702. For example, the network controller 108 can filter the detected inconsistent AP to keep inconsistent APs for consideration as neighbors in the neighbor discovery profile when the inconsistent AP has a RSSI stronger than a threshold, and can filter out instances when the inconsistent AP is detected with an RSI lower than a threshold so that the inconsistent AP does not appear in the neighbor discovery profile.

Another factor used to determine whether an inconsistent AP should be considered a neighboring AP is what channel the inconsistent AP was detected on. According to some examples, the method includes a decision being made as to whether the first AP is operating on a DFS channel at decision block 704.

According to some examples, in the instance where the first AP is operating on the DFS channel, greater weight can be given to instances in which the inconsistent AP was detected when the inconsistent AP was detected on a DFS channel at block 706. For example, the network controller 108 in FIG. 5 can determine that the first AP 504 is operating on a DFS channel. Upon making the determination, the network controller 108 can give a higher weight to instances in which the inconsistent AP is detected when the inconsistent AP is detected on the DFS channel.

According to some examples, in the instance where the first AP is not operating on the DFS channel, greater weight can be given to instances in which the inconsistent AP was detected when the inconsistent AP was detected on a non-DFS channel, at block 708. For example, the network controller 108 in FIG. 5 can determine that the first AP 504 is not operating on a DFS channel. Upon making the determination, the network controller 108 can give a higher weight to instances in which the inconsistent AP is detected when the inconsistent AP is detected on a non-DFS channel.

According to some examples, the method includes determining the inconsistent AP should be considered a neighboring AP to the first AP based on how often the inconsistent AP appears in the neighbor discovery profile for the first AP and what channel the inconsistent AP was detected at block 710. For example, the network controller 108 in FIG. 5 can determine that the inconsistent AP is a neighboring AP to the first AP 504 based on how often the inconsistent AP appears in the neighbor discovery profile and a weighted score indicating how confident the network controller 108 is that the inconsistent AP was properly detected. When the inconsistent AP regularly appears in the neighbor discovery profile, the network controller 108 can determine that the inconsistent AP is likely a neighboring AP.

FIG. 8 illustrates an example routine for determining a dwell time of a neighbor AP operating on a DFS channel according to some aspects of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence. Further, while the operations addressed with respect to FIG. 6 are referred to as being performed by the network controller 108, these operations can be performed by the A.I. Core 110.

As introduced herein, one cause of the inconsistency in the performance of neighbor discover algorithms is related to the ability to detect a neighbor using a DFS channel. In an example, the present technology can include setting an appropriate dwell time to ensure that APs are detect their neighbors.

According to some examples, the method includes determining, by the network controller, a number of the neighboring APs to the first AP operating on a DFS channel at block 802. For example, the network controller 108 in FIG. 5 can determine a number of neighboring APs to the first AP 504 that are operating on a DFS channel. The greater the number of APs operating on a DFS channel the greater the likelihood that a neighboring AP will not be discovered.

According to some examples, the method includes increasing, by the network controller, the dwell time of the neighboring APs and the first AP in relation to the number of the neighboring APs operating on the DFS channel at block 804. For example, the network controller 108 in FIG. 5 can increase the dwell time of the neighboring APs and the first AP 504 in relation to the number of neighboring APs operating on the DFS channel.

According to some examples, the method includes determining, by the network controller, the dwell times of the neighboring APs to the first AP at block 806. For example, the network controller 108 in FIG. 5 can determine the dwell times of the neighboring APs with regards to the first AP 504. While the purpose of neighbor discovery is to identify RF neighbors to an AP, some of those neighbors are controller by the same network controller so the network controller can know some information about likely RF neighbors already, such as the dwell times of APs controller by that controller. However, the same network controller often will not control all of the APs in the same RF neighborhood, so their remains a need to detect information from those APs. Based on the information known to the network controller, either from being the network controller attached to the APs, or from past information gathered by neighbor discovery requests, the network controller 108 can configure the APs controlled by the network controller 108 to have a dwell time at least long enough to detect its neighbors.

According to some examples, the method includes configuring, by the network controller, the first AP to send a neighbor discovery check on the home channel of the first AP at block 808. For example, the network controller 108 in FIG. 5 can configured the first AP 504 to send a neighbor discovery check on the home channel of the first AP 504. In some examples. the transmission time of the neighbor discovery check can be approximately half of the time of the dwell time of the neighboring APs. This operation can be particularly helpful for DFS channels. Since an AP that has already performed its CAC can transmit on the DFS channel, the APs operating on that channel can transmit their neighbor discovery requests on that DFS channel freely. APs scanning the channel can detect the neighbor discovery request and utilize that channel to reply with its information and send its own neighbor discovery request.

Figure 9:
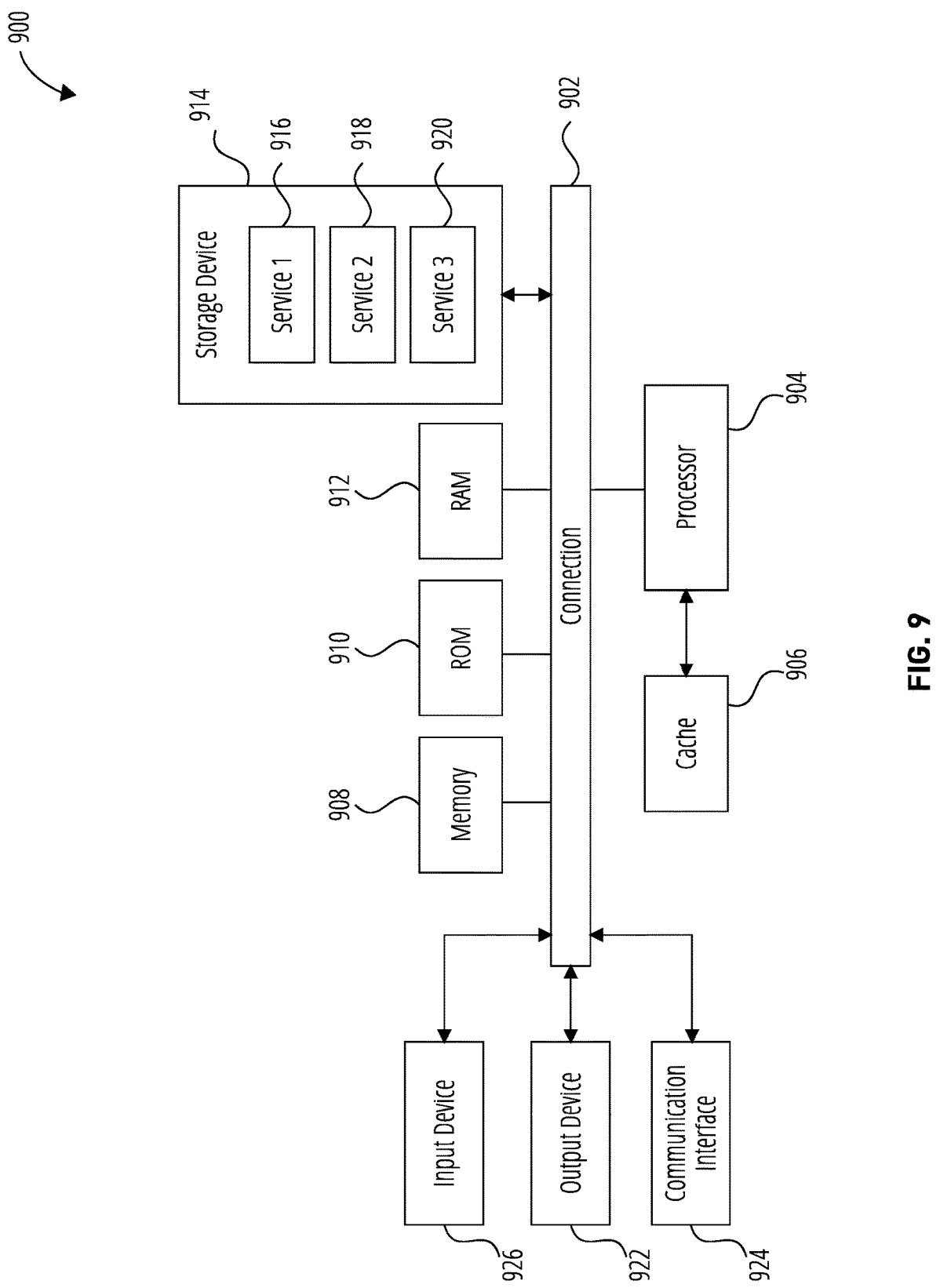
FIG. 9 illustrates an example of a computing system according to some aspects of the present technology.

FIG. 9 shows an example of computing system 900, which can be for example any computing device making up the system network 100 of FIG. 1, or any component thereof in which the components of the system are in communication with each other using connection 902. Connection 902 can be a physical connection via a bus, or a direct connection into processor 904, such as in a chipset architecture. Connection 902 can also be a virtual connection, networked connection, or logical connection.

In some embodiments, computing system 900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 900 includes at least one processing unit (CPU or processor) 904 and connection 902 that couples various system components including system memory 908, such as read-only memory (ROM) 910 and random access memory (RAM) 912 to processor 904. Computing system 900 can include a cache of high-speed memory 906 connected directly with, in close proximity to, or integrated as part of processor 904.

Processor 904 can include any general purpose processor and a hardware service or software service, such as services 916, 918, and 920 stored in storage device 914, configured to control processor 904 as well as a special-purpose processor where software instructions are incorporated into the actual processor design. Processor 904 may essentially be a completely self-contained computing system, containing multiple cores or processors, a bus, memory controller, cache, etc. A multi-core processor may be symmetric or asymmetric.

To enable user interaction, computing system 900 includes an input device 926, which can represent any number of input mechanisms, such as a microphone for speech, a touch-sensitive screen for gesture or graphical input, keyboard, mouse, motion input, speech, etc. Computing system 900 can also include output device 922, which can be one or more of a number of output mechanisms known to those of skill in the art. In some instances, multimodal systems can enable a user to provide multiple types of input/output to communicate with computing system 900. Computing system 900 can include communication interface 924, which can generally govern and manage the user input and system output. There is no restriction on operating on any particular hardware arrangement, and therefore the basic features here may easily be substituted for improved hardware or firmware arrangements as they are developed.

Storage device 914 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 914 can include software services, servers, services, etc., that when the code that defines such software is executed by the processor 904, it causes the system to perform a function. In some embodiments, a hardware service that performs a particular function can include the software component stored in a computer-readable medium in connection with the hardware components, such as processor 904, connection 902, output device 922, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware. firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Aspect 1. A method of access point (AP) discovery, by a network controller, the method comprising: receiving, from a first AP, AP configuration information for a plurality of potential neighboring APs, the AP configuration information being received from the plurality of potential neighboring APs as part of a neighbor discovery protocol performed at a plurality of times; where the neighbor discovery profile for the first AP includes historical potential neighbor information including an identification of the potential neighboring APs identified at the plurality of times; identifying an inconsistent AP in the neighbor discovery profile for the first AP, the inconsistent AP identified as undetected by the network controller during one or more of the plurality of times; determining whether the inconsistent AP should be considered a neighboring AP to the first AP based on how often the inconsistent AP appears in the neighbor discovery profile for the first AP; and determining a radio resource management (RRM) operation for the first AP using information known to the network controller about APs considered to be a neighboring AP to the first AP.

Aspect 2. The method of Aspect 1, further comprising: identifying an asymmetric AP for inclusion in the neighbor discovery profile for the first AP as one of the potential neighboring APs, the asymmetric AP is one which is not detected by the first AP, but the first AP was detected by the asymmetric AP which reported the first AP to the network controller.

Aspect 3. The method of any of Aspects 1 to 2, further comprising: calculating a neighbor discovery index (NDI) which is a metric that represents a spectral power density around the first AP, wherein the NDI is used to determine the RRM operation for the first AP.

Aspect 4. The method of any of Aspects 1 to 3, wherein the neighbor discovery index (NDI) is a ratio of a sum of RSSI values from the neighboring APs and a number of neighboring APs.

Aspect 5. The method of any of Aspects 1 to 4, further comprising: determining, by the network controller, the dwell times of the neighboring APs to the first AP; configuring, by the network controller, the first AP to send a neighbor discovery check on the home channel of the first AP, wherein the transmission time of the neighbor discovery check is approximately half of the time of the dwell time of the neighboring APs.

Aspect 6. The method of any of Aspects 1 to 5, further comprising: determining, by the network controller, a number of the neighboring APs to the first AP operating on a DFS channel of a plurality of DFS channels; and increasing, by the network controller, the dwell time of the neighboring APs and the first AP in relation to the number of the neighboring APs operating on the DFS channels, such that the dwell time is longer when there are more of the neighboring APs operating on the DFS channels.

Aspect 7. The method of any of Aspects 1 to 6, wherein the determining whether the inconsistent AP should be considered a neighboring AP to the first AP further comprises: giving a higher weight to instances in which the inconsistent AP was detected when the inconsistent AP was detected on a non-DFS channel when the first AP is operating on a DFS channel.

Aspect 8. The method of any of Aspects 1 to 7, wherein the determining whether the inconsistent AP should be considered a neighboring AP to the first AP further comprises: giving a higher weight to instances in which the inconsistent AP was detected when the inconsistent AP was detected on a non-DFS channel when the first AP is also operating on a non-DFS channel.

Aspect 9. The method of any of Aspects 1 to 8, wherein the determining whether the inconsistent AP should be considered a neighboring AP to the first AP further comprises: filtering the instances in which the inconsistent AP is detected when the inconsistent AP has a RSSI stronger than a threshold.

Aspect 10. The method of any of Aspects 1 to 9, further comprising: identifying the plurality of potential neighboring AP from a received signal strength indicator (RSSI) of at least one of the neighbor APs.

Aspect 11. The method of any of Aspects 1 to 10, wherein the set of neighboring APs is identified in the historical network information based on a transmit power control exceeding a threshold.

Aspect 12. A network device comprising: one or more memories having computer-readable instructions stored therein; and one or more processors configured to execute the computer-readable instructions to: receiving, from a first AP, AP configuration information for a plurality of potential neighboring APs, the AP configuration information being received from the plurality of potential neighboring APs as part of a neighbor discovery protocol performed at a plurality of times; where the neighbor discovery profile for the first AP includes historical potential neighbor information including an identification of the potential neighboring APs identified at the plurality of times; identify an inconsistent AP in the neighbor discovery profile for the first AP, the inconsistent AP identified as undetected by the network controller during one or more of the plurality of times; determining whether the inconsistent AP should be considered a neighboring AP to the first AP based on how often the inconsistent AP appears in the neighbor discovery profile for the first AP; and determine a radio resource management (RRM) operation for the first AP using information known to the network controller about APs considered to be a neighboring AP to the first AP.

Aspect 13. The network device of Aspect 12, wherein the instructions further cause the processor to: identify an asymmetric AP for inclusion in the neighbor discovery profile for the first AP as one of the potential neighboring APs, the asymmetric AP is one which is not detected by the first AP, but the first AP was detected by the asymmetric AP which reported the first AP to the network controller.

Aspect 14. The network device of any of Aspects 12 to 13, wherein the instructions further cause the processor to: calculate a neighbor discovery index (NDI) which is a metric that represents a spectral power density around the first AP, wherein the NDI is used to determine the RRM operation for the first AP.

Aspect 15. The network device of any of Aspects 12 to 14, wherein the neighbor discovery index (NDI) is a ratio of a sum of RSSI values from the neighboring APs and a number of neighboring APs.

Aspect 16. The network device of any of Aspects 12 to 15, wherein determining, by the network controller, the dwell times of the neighboring APs to the first AP; configuring, by the network controller., wherein the transmission time of the neighbor discovery check is approximately half of the time of the dwell time of the neighboring APs.

Aspect 17. The network device of any of Aspects 12 to 16, wherein determining, by the network controller, a number of the neighboring APs to the first AP operating on a DFS channel of a plurality of DFS channels; and increasing, by the network controller, the dwell time of the neighboring APs and the first AP in relation to the number of the neighboring APs operating on the DFS channels, such that the dwell time is longer when there are more of the neighboring APs operating on the DFS channels.

Aspect 18. The network device of any of Aspects 12 to 17, wherein the instructions further cause the processor to: give a higher weight to instances in which the inconsistent AP was detected when the inconsistent AP was detected on a non-DFS channel when the first AP is operating on a DFS channel.

Aspect 19. The network device of any of Aspects 12 to 18, wherein the instructions further cause the processor to: give a higher weight to instances in which the inconsistent AP was detected when the inconsistent AP was detected on a non-DFS channel when the first AP is also operating on a non-DFS channel.

Aspect 20. The network device of any of Aspects 12 to 19, wherein the instructions further cause the processor to: filter the instances in which the inconsistent AP is detected when the inconsistent AP has a RSSI stronger than a threshold.

Aspect 21. The network device of any of Aspects 12 to 20, wherein the instructions further cause the processor to: identify the plurality of potential neighboring AP from a received signal strength indicator (RSSI) of at least one of the neighbor APs.

Aspect 22. The network device of any of Aspects 12 to 21, wherein the set of neighboring APs is identified in the historical network information based on a transmit power control exceeding a threshold.

Aspect 23. A non-transitory computer-readable medium comprising computer-readable instructions, which when executed by one or more processors of a network appliance, cause the network appliance to: execute the computer readable medium and cause the processor to: receiving, from a first AP, AP configuration information for a plurality of potential neighboring APs, the AP configuration information being received from the plurality of potential neighboring APs as part of a neighbor discovery protocol performed at a plurality of times; where the neighbor discovery profile for the first AP includes historical potential neighbor information including an identification of the potential neighboring APs identified at the plurality of times; identify an inconsistent AP in the neighbor discovery profile for the first AP, the inconsistent AP identified as undetected by the network controller during one or more of the plurality of times; determining whether the inconsistent AP should be considered a neighboring AP to the first AP based on how often the inconsistent AP appears in the neighbor discovery profile for the first AP; and determine a radio resource management (RRM) operation for the first AP using information known to the network controller about APs considered to be a neighboring AP to the first AP.

Aspect 24. The non-transitory computer readable medium of Aspect 23, wherein the computer-readable medium further comprises instructions that, when executed by the network appliance, cause the network appliance to: identify an asymmetric AP for inclusion in the neighbor discovery profile for the first AP as one of the potential neighboring APs, the asymmetric AP is one which is not detected by the first AP, but the first AP was detected by the asymmetric AP which reported the first AP to the network controller.

Aspect 25. The non-transitory computer readable medium of any of Aspects 23 to 24. wherein the computer-readable medium further comprises instructions that, when executed by the network appliance, cause the network appliance to: calculate a neighbor discovery index (NDI) which is a metric that represents a spectral power density around the first AP, wherein the NDI is used to determine the RRM operation for the first AP.

Aspect 26. The non-transitory computer readable medium of any of Aspects 23 to 25, wherein the neighbor discovery index (NDI) is a ratio of a sum of RSSI values from the neighboring APs and a number of neighboring APs.

Aspect 27. The non-transitory computer readable medium of any of Aspects 23 to 26, wherein determining, by the network controller, the dwell times of the neighboring APs to the first AP; configuring, by the network controller., wherein the transmission time of the neighbor discovery check is approximately half of the time of the dwell time of the neighboring APs.

Aspect 28. The non-transitory computer readable medium of any of Aspects 23 to 27, wherein determining, by the network controller, a number of the neighboring APs to the first AP operating on a DFS channel of a plurality of DFS channels; and increasing, by the network controller, the dwell time of the neighboring APs and the first AP in relation to the number of the neighboring APs operating on the DFS channels, such that the dwell time is longer when there are more of the neighboring APs operating on the DFS channels.

Aspect 29. The non-transitory computer readable medium of any of Aspects 23 to 28. wherein the computer-readable medium further comprises instructions that, when executed by the network appliance, cause the network appliance to: give a higher weight to instances in which the inconsistent AP was detected when the inconsistent AP was detected on a non-DFS channel when the first AP is operating on a DFS channel.

Aspect 30. The non-transitory computer readable medium of any of Aspects 23 to 29. wherein the computer-readable medium further comprises instructions that, when executed by the network appliance, cause the network appliance to: give a higher weight to instances in which the inconsistent AP was detected when the inconsistent AP was detected on a non-DFS channel when the first AP is also operating on a non-DFS channel.

Aspect 31. The non-transitory computer readable medium of any of Aspects 23 to 30, wherein the computer-readable medium further comprises instructions that, when executed by the network appliance, cause the network appliance to: filter the instances in which the inconsistent AP is detected when the inconsistent AP has a RSSI stronger than a threshold.

Aspect 32. The non-transitory computer readable medium of any of Aspects 23 to 31, wherein the computer-readable medium further comprises instructions that, when executed by the network appliance, cause the network appliance to: identify the plurality of potential neighboring AP from a received signal strength indicator (RSSI) of at least one of the neighbor APs.

Aspect 33. The non-transitory computer readable medium of any of Aspects 23 to 32, wherein the set of neighboring APs is identified in the historical network information based on a transmit power control exceeding a threshold.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method of access point (AP) discovery, by a network controller, the method comprising:

receiving, from a first AP, AP configuration information for a plurality of potential neighboring APs, the AP configuration information being received from the plurality of potential neighboring APs as part of a neighbor discovery protocol performed at a plurality of times;

storing the AP configuration information for the plurality of potential neighboring APs in a neighbor discovery profile for the first AP, where the neighbor discovery profile for the first AP includes historical potential neighbor information including an identification of the potential neighboring APs identified at the plurality of times;

identifying an inconsistent AP in the neighbor discovery profile for the first AP the inconsistent AP identified as being detected by the first AP during a first portion of the plurality of times but undetected by the first AP during a second, subsequent portion of the plurality of times;

in response to the inconsistent AP being undetected during the second, subsequent portion of the plurality of times, determining that the inconsistent AP should be considered a neighboring AP to the first AP based on a frequency of appearance of the inconsistent AP in the historical potential neighbor information;

calculating a neighbor discovery index (NDI) which is a metric that represents a spectral power density around the first AP; and determining a radio resource management (RRM) operation for the first AP using the NDI.

2. The method of claim 1, further comprising:

identifying an asymmetric AP for inclusion in the neighbor discovery profile for the first AP as one of the potential neighboring APs, the asymmetric AP is one which is not detected by the first AP, but the first AP was detected by the asymmetric AP which reported the first AP to the network controller.

3. The method of claim 1, wherein the neighbor discovery index (NDI) is a ratio of a sum of RSSI values from the neighboring APs and a number of neighboring APs.

4. The method of claim 1, further comprising:

determining, by the network controller, a dwell time of the neighboring APs and the first AP;

configuring, by the network controller, the first AP to send a neighbor discovery check on a home channel of the first AP, wherein a transmission time of the neighbor discovery check is approximately half of the time of the dwell time of the neighboring APs.

5. The method of claim 4, further comprising:

determining, by the network controller, a number of the neighboring APs to the first AP operating on a DFS channel of a plurality of DFS channels; and increasing, by the network controller, the dwell time of the neighboring APs and the first AP in relation to the number of the neighboring APs operating on the DFS channels, such that the dwell time is longer when there are more of the neighboring APs operating on the DFS channels.

6. The method of claim 1, wherein the determining whether the inconsistent AP should be considered the neighboring AP to the first AP further comprises:

giving a higher weight to instances in which the inconsistent AP was detected when the inconsistent AP was detected on a non-DFS channel when the first AP is operating on a DFS channel;

giving the higher weight to the instances in which the inconsistent AP was detected when the inconsistent AP was detected on the non-DFS channel when the first AP is also operating on the non-DFS channel; or filtering the instances in which the inconsistent AP is detected when the inconsistent AP has a RSSI stronger than a threshold.

7. The method of claim 1, wherein determining the RRM operation for the first AP also includes using information known to the network controller about APs considered to be the neighboring AP to the first AP, wherein the information known to the network controller includes the determined inconsistent AP as a neighboring AP despite the inconsistent AP being undetected during the second, subsequent portion of the plurality of times.

8. A network device comprising:

one or more memories having computer-readable instructions stored therein; and one or more processors configured to execute the computer-readable instructions to:

receive, from a first AP, AP configuration information for a plurality of potential neighboring APs, the AP configuration information being received from the plurality of potential neighboring APs as part of a neighbor discovery protocol performed at a plurality of times;

store the AP configuration information for the plurality of potential neighboring APs in a neighbor discovery profile for the first AP, where the neighbor discovery profile for the first AP includes historical potential neighbor information including an identification of the potential neighboring APs identified at the plurality of times;

identify an inconsistent AP in the neighbor discovery profile for the first AP, the inconsistent AP identified as being detected by the first AP during a first portion of the plurality of times but undetected by the first AP during a second, subsequent portion of the plurality of times;

in response to the inconsistent AP being undetected during the second, subsequent portion of the plurality of times, determine that the inconsistent AP should be considered a neighboring AP to the first AP based on a frequency of appearance of the inconsistent AP in the historical potential neighbor information;

calculating a neighbor discovery index (NDI) which is a metric that represents a spectral power density around the first AP; and determine a radio resource management (RRM) operation for the first AP using the NDI.

9. The network device of claim 8, wherein the instructions further cause the processor to:

identify an asymmetric AP for inclusion in the neighbor discovery profile for the first AP as one of the potential neighboring APs, the asymmetric AP is one which is not detected by the first AP, but the first AP was detected by the asymmetric AP which reported the first AP to the network controller.

10. The network device of claim 8, the neighbor discovery index (NDI) is a ratio of a sum of RSSI values from the neighboring APs and a number of neighboring APs.

11. The network device of claim 8, wherein the instructions further cause the one or more processors to:

determine, by the network controller, dwell times of the neighboring APs to the first AP; and configure, by the network controller, the first AP to send a neighbor discovery check on a home channel of the first AP, wherein a transmission time of a neighbor discovery check is approximately half of the time of the dwell time of the neighboring APs.

12. The network device of claim 11, wherein the instructions further cause the one or more processors to:

determine, by the network controller, a number of the neighboring APs to the first AP operating on a DFS channel of a plurality of DFS channels; and increase, by the network controller, the dwell time of the neighboring APs and the first AP in relation to the number of the neighboring APs operating on the DFS channels, such that the dwell time is longer when there are more of the neighboring APs operating on the DFS channels.

13. The network device of claim 8, wherein the instructions further cause the processor to:

give a higher weight to instances in which the inconsistent AP was detected when the inconsistent AP was detected on a non-DFS channel when the first AP is operating on a DFS channel;

give the higher weight to the instances in which the inconsistent AP was detected when the inconsistent AP was detected on the non-DFS channel when the first AP is also operating on the non-DFS channel; or filter the instances in which the inconsistent AP is detected when the inconsistent AP has a RSSI stronger than a threshold.

14. The network device of claim 8, wherein determining the RRM operation for the first AP also includes using information known to the network controller about APs considered to be the neighboring AP to the first AP, wherein the information known to the network controller includes the determined inconsistent AP as a neighboring AP despite the inconsistent AP being undetected during the second, subsequent portion of the plurality of times.

15. A non-transitory computer-readable medium comprising computer-readable instructions, which when executed by one or more processors of a network appliance, cause the network appliance to:

receive, from a first AP, AP configuration information for a plurality of potential neighboring APs, the AP configuration information being received from the plurality of potential neighboring APs as part of a neighbor discovery protocol performed at a plurality of times;

store the AP configuration information for the plurality of potential neighboring APs in a neighbor discovery profile for the first AP, where the neighbor discovery profile for the first AP includes historical potential neighbor information including an identification of the potential neighboring APs identified at the plurality of times;

identify an inconsistent AP in the neighbor discovery profile for the first AP, the inconsistent AP identified as being detected by the first AP during a first portion of the plurality of times but undetected by the first AP during a second, subsequent portion of the plurality of times;

in response to the inconsistent AP being undetected during the second, subsequent portion of the plurality of times, determine that the inconsistent AP should be considered a neighboring AP to the first AP based on a frequency of appearance of the inconsistent AP in the historical potential neighbor information;

calculating a neighbor discovery index (NDI) which is a metric that represents a spectral power density around the first AP; and determine a radio resource management (RRM) operation for the first AP using the NDI.

16. The non-transitory computer-readable medium of claim 15, wherein the computer-readable medium further comprises instructions that, when executed by the network appliance, cause the network appliance to:

identify an asymmetric AP for inclusion in the neighbor discovery profile for the first AP as one of the potential neighboring APs, the asymmetric AP is one which is not detected by the first AP, but the first AP was detected by the asymmetric AP which reported the first AP to the network controller.

17. The non-transitory computer-readable medium of claim 15, wherein the neighbor discovery index (NDI) is a ratio of a sum of RSSI values from the neighboring APs and a number of neighboring APs.

18. The non-transitory computer-readable medium of claim 15, wherein the computer-readable medium further comprises instructions that, when executed by the network appliance, cause the network appliance to:

determine, by the network controller, dwell times of the neighboring APs to the first AP; and configure, by the network controller, the first AP to send a neighbor discovery check on a home channel of the first AP, wherein a transmission time of a neighbor discovery check is approximately half of the time of the dwell time of the neighboring APs.

19. The non-transitory computer-readable medium of claim 15, wherein the computer-readable medium further comprises instructions that, when executed by the network appliance, cause the network appliance to:

give a higher weight to instances in which the inconsistent AP was detected when the inconsistent AP was detected on a non-DFS channel when the first AP is operating on a DFS channel;

give the higher weight to the instances in which the inconsistent AP was detected when the inconsistent AP was detected on the non-DFS channel when the first AP is also operating on the non-DFS channel; or filter the instances in which the inconsistent AP is detected when the inconsistent AP has a RSSI stronger than a threshold.

20. The non-transitory computer-readable medium of claim 15, wherein the computer-readable medium further comprises instructions that, when executed by the network appliance, cause the network appliance to:

determine, by the network controller, a number of the neighboring APs to the first AP operating on a DFS channel of a plurality of DFS channels; and increase, by the network controller, the dwell time of the neighboring APs and the first AP in relation to the number of the neighboring APs operating on the DFS channels, such that the dwell time is longer when there are more of the neighboring APs operating on the DFS channels.

* * * * *